United States Patent
Choi et al.

(10) Patent No.: US 11,720,997 B2
(45) Date of Patent: Aug. 8, 2023

(54) ARTIFICIAL INTELLIGENCE (AI) ENCODING DEVICE AND OPERATING METHOD THEREOF AND AI DECODING DEVICE AND OPERATING METHOD THEREOF

(71) Applicant: SAMSUNG ELECTRONICS CO., LTD., Suwon-si (KR)

(72) Inventors: Minseok Choi, Suwon-si (KR); Kwangpyo Choi, Suwon-si (KR); Jaehwan Kim, Suwon-si (KR)

(73) Assignee: SAMSUNG ELECTRONICS CO.. LTD., Suwon-si (KR)

( * ) Notice: Subject to any disclaimer, the term of this patent is extended or adjusted under 35 U.S.C. 154(b) by 322 days.

(21) Appl. No.: 16/599,291

(22) Filed: Oct. 11, 2019

(65) Prior Publication Data
US 2020/0126185 A1   Apr. 23, 2020

(30) Foreign Application Priority Data

Oct. 19, 2018 (KR) .................. 10-2018-0125406
Nov. 12, 2018 (KR) .................. 10-2018-0138298
(Continued)

(51) Int. Cl.
*G06T 3/40* (2006.01)
*H04N 19/42* (2014.01)
(Continued)

(52) U.S. Cl.
CPC ............. *G06T 3/4046* (2013.01); *G06N 3/02* (2013.01); *H04N 19/33* (2014.11); *H04N 19/42* (2014.11); *H04N 19/85* (2014.11)

(58) Field of Classification Search
CPC .................. G06T 9/002; G06T 3/4046; G06T 2207/20084; G06N 3/02–105;
(Continued)

(56) References Cited

U.S. PATENT DOCUMENTS 7,400,588 B2   7/2008   Izzat et al.
8,184,164 B2   5/2012   Yang et al.
(Continued)

FOREIGN PATENT DOCUMENTS

CN   108022212 A   5/2018
JP   2008-527810 A   7/2008
(Continued)

OTHER PUBLICATIONS

Kim, Jaehwan, et al. "Dynamic frame resizing with convolutional neural network for efficient video compression." Applications of Digital Image Processing XL. vol. 10396. International Society for Optics and Photonics, 2017. (Year: 2017).*

(Continued)

*Primary Examiner* — Geoffrey E Summers
(74) *Attorney, Agent, or Firm* — Sughrue Mion, PLLC

(57) ABSTRACT

An artificial intelligence (AI) decoding apparatus includes a memory storing one or more instructions, and a processor configured to execute the stored one or more instructions to obtain image data corresponding to a first image that is downscaled from an original image by using first parameters of a first filter kernel included in a first deep neural network (DNN), reconstruct a second image corresponding to the first image, based on the obtained image data, and obtain a third image that is upscaled from the reconstructed second image, by performing an operation between the reconstructed second image and second parameters of a second filter kernel included in a second DNN corresponding to the first DNN. Each of the second parameters is represented by a product of a scale factor and one among integer values, and each of the integer values is 0 or $\pm 2^n$, where n is an integer.

17 Claims, 18 Drawing Sheets

(30) Foreign Application Priority Data

Apr. 8, 2019 (KR) .................. 10-2019-0041099
Jun. 28, 2019 (KR) .................. 10-2019-0078343

(51) Int. Cl.
*H04N 19/33* (2014.01)
*G06N 3/02* (2006.01)
*H04N 19/85* (2014.01)

(58) Field of Classification Search
CPC ........ H04N 19/85; H04N 19/42; H04N 19/33; H04N 19/172; H04N 19/117; H04N 19/80; H04N 19/132; H04N 19/46
USPC .................................................. 382/156–158
See application file for complete search history.

(56) References Cited

U.S. PATENT DOCUMENTS

| | | |
|---|---|---|
| 8,385,406 B2 | 2/2013 | Cho et al. |
| 9,251,572 B2 | 2/2016 | Shu et al. |
| 9,679,213 B2 | 6/2017 | Yang et al. |
| 9,749,580 B2 | 8/2017 | Suh et al. |
| 10,148,723 B2 | 12/2018 | Falvo |
| 10,218,971 B2 | 2/2019 | Dong et al. |
| 10,512,116 B2 | 12/2019 | Chang et al. |
| 10,817,989 B2 | 10/2020 | Kim et al. |
| 10,950,009 B2 | 3/2021 | Dinh et al. |
| 10,979,718 B2 | 4/2021 | Chou et al. |
| 11,190,839 B2 | 11/2021 | Niina et al. |
| 2007/0189392 A1 | 8/2007 | Tourapis et al. |
| 2012/0014507 A1 | 1/2012 | Wu et al. |
| 2012/0230604 A1 | 9/2012 | Yamajo et al. |
| 2014/0086319 A1 | 3/2014 | Xu et al. |
| 2014/0177706 A1 | 6/2014 | Fernandes et al. |
| 2015/0256828 A1 | 9/2015 | Dong et al. |
| 2016/0163023 A1 | 6/2016 | Wey et al. |
| 2016/0316508 A1 | 10/2016 | Hong et al. |
| 2016/0360155 A1 | 12/2016 | Civanlar et al. |
| 2017/0104993 A1 | 4/2017 | Jeong et al. |
| 2017/0208345 A1 | 7/2017 | Jeong et al. |
| 2017/0215225 A1 | 7/2017 | Yi et al. |
| 2017/0287109 A1 | 10/2017 | Tasfi |
| 2017/0347061 A1 | 11/2017 | Wang et al. |
| 2018/0107925 A1 | 4/2018 | Choi et al. |
| 2018/0139458 A1 | 5/2018 | Wang et al. |
| 2018/0176570 A1 | 6/2018 | Rippel et al. |
| 2018/0249158 A1 | 8/2018 | Huang et al. |
| 2018/0288440 A1 | 10/2018 | Chao |
| 2018/0293706 A1 | 10/2018 | Viswanathan et al. |
| 2018/0302456 A1 | 10/2018 | Katsavounidis et al. |
| 2019/0013822 A1 | 1/2019 | Marpe et al. |
| 2019/0075301 A1* | 3/2019 | Chou .................. H04N 19/132 |
| 2019/0102640 A1 | 4/2019 | Balasubramanian |
| 2019/0205606 A1 | 7/2019 | Zhou et al. |
| 2019/0230354 A1 | 7/2019 | Kim |
| 2019/0295282 A1 | 9/2019 | Smolyanskiy et al. |
| 2020/0097806 A1 | 3/2020 | Chen et al. |
| 2020/0258197 A1 | 8/2020 | Tai et al. |
| 2021/0042453 A1* | 2/2021 | Yoshiyama ............. G06F 30/20 |

FOREIGN PATENT DOCUMENTS

| | | | |
|---|---|---|---|
| JP | 2009-540625 A | 11/2009 | |
| JP | 2012-191250 A | 10/2012 | |
| KR | 10-0224801 B1 | 10/1999 | |
| KR | 10-1425602 B1 | 7/2014 | |
| KR | 10-2014-0145560 A | 12/2014 | |
| KR | 10-2015-0087103 A | 7/2015 | |
| KR | 10-2015-0135637 A | 12/2015 | |
| KR | 10-2016-0036662 A | 4/2016 | |
| KR | 10-2016-0080929 A | 7/2016 | |
| KR | 10-2017-0059040 A | 5/2017 | |
| KR | 10-2017-0100045 A | 9/2017 | |
| KR | 10-2018-0001428 A | 1/2018 | |
| KR | 10-2018-0043154 A | 4/2018 | |
| KR | 10-2018-0052651 A | 5/2018 | |
| KR | 10-1885855 B1 | 8/2018 | |
| KR | 10-2018-0100976 A | 9/2018 | |
| KR | 10-2018-0108288 A | 10/2018 | |
| WO | 2016/205733 A1 | 12/2016 | |
| WO | 2017036370 A1 | 3/2017 | |
| WO | 2018/091486 A1 | 5/2018 | |
| WO | 2018/140294 A1 | 8/2018 | |
| WO | 2018/140596 A2 | 8/2018 | |
| WO | 2018/143992 A1 | 8/2018 | |
| WO | 2018/170393 A9 | 9/2018 | |
| WO | 2018-214913 A1 | 11/2018 | |
| WO | 2021/090063 A1 | 5/2021 | |

OTHER PUBLICATIONS

Leng, Cong, et al. "Extremely Low Bit Neural Network: Squeeze the Last Bit Out with ADMM." arXiv preprint arXiv:1707.09870 (2017). (Year: 2017).*

Xu, Weihong, et al. "Efficient deep convolutional neural networks accelerator without multiplication and retraining." 2018 IEEE International Conference on Acoustics, Speech and Signal Processing (ICASSP). IEEE, 2018. (Year: 2018).*

Elhoushi, Mostafa, et al. "DeepShift: Towards Multiplication-Less Neural Networks." arXiv preprint arXiv:1905.13298v2 (2019). (Year: 2019).*

Guo, Yunhui. "A survey on methods and theories of quantized neural networks." arXiv preprint arXiv:1808.04752v2 (2018). (Year: 2018).*

Kenue, Surender K., and James F. Greenleaf. "Efficient convolution kernels for computerized tomography." Ultrasonic imaging 1.3 (1979): 232-244. (Year: 1979).*

Hou, Lu, and James T. Kwok. "Loss-aware weight quantization of deep networks." arXiv preprint arXiv:1802.08635 (2018). (Year: 2018).*

Marchesi, Michele, et al. "Fast neural networks without multipliers." IEEE transactions on Neural Networks 4.1 (1993): 53-62. (Year: 1993).*

Jiang, Feng, et al. "An end-to-end compression framework based on convolutional neural networks." IEEE Transactions on Circuits and Systems for Video Technology 28.10 (2017): 3007-3018. (Year: 2017).*

Gorodilov, Artem, Dmitriy Gavrilov, and Dmitriy Schelkunov. "Neural networks for image and video compression." 2018 International Conference on Artificial Intelligence Applications and Innovations (IC-AIAI). IEEE, 2019. (Year: 2018).*

Afonso, Mariana, Fan Zhang, and David R. Bull. "Spatial resolution adaptation framework for video compression." Applications of Digital Image Processing XLI. vol. 10752. SPIE, 2018. (Year: 2018).*

"Rate Control and H.264." Pixel Tools, Apr. 4, 2017. <https://www.pixeltools.com/rate_control_paper.html>. Internet Archive. <https://web.archive.org/web/20170404124926/https://www.pixeltools.com/rate_control_paper.html>. (Year: 2017).*

Mohammad Rastegari et al. "XNOR-Net: ImageNet Classification Using Binary Convolutional Neural Networks" Sep. 17, 2016, ECCV 2016, Oct. 8-16, 2016, Springer Link, (18 pages total)).

Matthieu Courbariaux et al. "BinaryConnect: Training Deep Neural Networks with binary weights during propagations", v3, Apr. 18, 2016 (submission date of v3), (v1 previously submitted on Nov. 2, 2015), NIPS 2015, Dec. 7-12, 2015, arXiv.org, (10 pages total).

Communication dated Jun. 7, 2021, from the Intellectual Property Office of India in Application No. 201924041670.

Decision to Refuse dated Aug. 9, 2021, issued by the Korean Intellectual Property Office in Korean Application No. 10-2019-0062583.

Decision to Refuse dated Jun. 21, 2021, issued by the Korean Intellectual Property Office in Korean Application No. 10-2019-0062583.

(56) References Cited

OTHER PUBLICATIONS

Decision to Refuse dated Jun. 21, 2021, issued by the Korean Intellectual Property Office in Korean Application No. 10-2019-0066057.
Decision to Refuse dated Aug. 9, 2021, issued by the Korean Intellectual Property Office in Korean Application No. 10-2019-0066057.
Communication dated Jun. 29, 2021, from the European Patent Office in European Application No. 19872393.4.
Yue Li et al., "Learning a Convolutional Neural Network for Image Compact-Resolution", IEEE Transactions on Image Processing, Mar. 2019, vol. 28, No. 3, pp. 1092-1107 (16 pages total).
Yue Li et al., "Convolutional Neural Network-Based Block Up-Sampling for Intra Frame Coding", IEEE Transactions on Circuits and Systems for Video Technology, Sep. 2018, vol. 28, No. 9, pp. 2316-2330 (15 pages total).
Decision to Refuse dated Jun. 3, 2021, issued by the Korean Intellectual Property Office in Korean Application No. 10-2019-0041102.
Communication dated Jun. 21, 2021, issued by the Korean Intellectual Property Office in Korean Application No. 10-2019-0041109.
Communication dated Jul. 20, 2021, from the European Patent Office in European Application No. 19874036.7.
Anonymous et al., "Why do we need floats for using neural networks?", Artificial Intelligence Stack Exchange, Aug. 16, 2018, pp. 1-8 (8 pages total).
Suyog Gupta et al., "Deep Learning with Limited Numerical Precision", Feb. 9, 2015, pp. 1-10 (10 pages total).
Decision to Refuse dated Jul. 21, 2021, issued by the Korean Intellectual Property Office in Korean Application No. 10-2019-0077250.
Communication dated Jul. 5, 2021, from the European Patent Office in European Application No. 19873269.5.
Decision to Refuse dated Jul. 21, 2021, issued by the Korean Intellectual Property Office in Korean Application No. 10-2019-0076569.
Communication dated Jun. 29, 2021, from the European Patent Office in European Application No. 19873762.9.
Lucas Theis et al., "Lossy Image Compression With Compressive Autoencoders", ICLR, Mar. 1, 2017, pp. 1-19 (19 pages total).
Communication dated Jan. 25, 2021, issued by the International Searching Authority in counterpart International Application No. PCT/KR2020/015136 (PCT/ISA/220, 210, 237).
Communication (PCT/ISA/220, PCT/ISA/210 & PCT/ISA/237) dated Dec. 4, 2019 by the International Searching Authority in counterpart International Patent Application No. PCT/KR2019/010645.
Communication (PCT/ISA/220, PCT/ISA/210 & PCT/ISA/237) dated Jan. 23, 2020 by the International Searching Authority in counterpart International Patent Application No. PCT/KR2019/012836.
Communication (PCT/ISA/220, PCT/ISA/210 & PCT/ISA/237) dated Jan. 29, 2020 by the International Searching Authority in counterpart International Patent Application No. PCT/KR2019/013595.
Communication (PCT/ISA/220, PCT/ISA/210 & PCT/ISA/237) dated Jan. 30, 2020 by the International Searching Authority in counterpart International Patent Application No. PCT/KR2019/013421.
Communication (PCT/ISA/220, PCT/ISA/210 & PCT/ISA/237) dated Feb. 5, 2020 by the International Searching Authority in counterpart International Patent Application No. PCT/KR2019/013483.
Communication (PCT/ISA/220, PCT/ISA/210 & PCT/ISA/237) dated Feb. 21, 2020 by the International Searching Authority in counterpart International Patent Application No. PCT/KR2019/013733.

Jeong, Woojin et al., "Efficient Super-Resolution Method for Single Image based on Deep Neural Networks", Journal of the Institute of Electronics and Information Engineers, vol. 55, No. 6, pp. 779-786, Jun. 2018. (10 pages total).
Sergey Ioffe et al., "Batch Normalization: Accelerating Deep Network Training by Reducing Internal Covariate Shift", Proceedings of the 32nd International Conference on Machine Learning 2015, vol. 37, pp. 448-456, 2015. (11 pages total).
Seungbin Lee et al., "Performance Analysis of Convolution Neural Network and Generative Adversarial Network for Super Resolution", Journal of the Korean Institute of Information Scientists and Engineers, Jun. 2017, pp. 931-933. (6 pages total).
Communication dated Jan. 5, 2021, issued by the Korean Intellectual Property Office in Korean Application No. 10-2019-0076569.
Communication dated Jan. 6, 2021, issued by the Korean Intellectual Property Office in Korean Application No. 10-2019-0077250.
Communication dated Jan. 13, 2021, issued by the Korean Intellectual Property Office in Korean Application No. 10-2019-0078344.
Communication dated Jan. 12, 2021, issued by the Korean Intellectual Property Office in Korean Application No. 10-2019-0078343.
Communication dated Dec. 22, 2020, issued by the Korean Intellectual Property Office in Korean Application No. 10-2019-0066057.
Communication dated Jan. 14, 2021, issued by the Korean Intellectual Property Office in Korean Application No. 10-2020-7000378.
Communication dated Dec. 16, 2020, issued by the Korean Intellectual Property Office in Korean Application No. 10-2019-0062583.
Communication dated Dec. 11, 2020, issued by the Korean Intellectual Property Office in Korean Application No. 10-2019-0041109.
Communication dated Dec. 11, 2020, from the European Patent Office in European Application No. 19 183 429.0.
Communication dated Dec. 10, 2020, issued by the Korean Intellectual Property Office in Korean Application No. 10-2019-0041102.
Michalis Giannopoulos et al., "Convolutional Neural Networks for Video Quality Assessment", Cornell University, Sep. 26, 2018, pp. 1-12 (12 pages total).
Seunghyun Cho et al., "A Technical Analysis on Deep Learning based Image and Video Compression", Journal of Broadcast Engineering Society, Korean Institute of Broadcast and Media Engineers, May 2018, vol. 23, No. 3, pp. 383-394 (12 pages total).
Nick Johnston et al., "Improved Lossy Image Compression with Priming and Spatially Adaptive Bit Rates for Recurrent Networks", Cornell University, Mar. 29, 2017, pp. 1-9 (9 pages total).
Feng Jiang et al., "An End-to-End Compression Framework Based on Convolutional Neural Networks", Cornell University, Aug. 2, 2017, pp. 1-13 (13 pages total).
Jiwon Kim et al., "Deeply-Recursive Convolutional Network for Image Super-Resolution", Cornell University, Nov. 11, 2016, pp. 1-9 (9 pages total).
Suo Qiu et al., "FReLU: Flexible Rectified Linear Units for Improving Convolutional Neural Networks" Cornell University, Jan. 29, 2018, pp. 1-6 (6 pages total).
Xiao-Jiao Mao et al., "Title:Image Restoration Using Convolutional Auto-encoders with Symmetric Skip Connections",, arxiv.org, Cornell university, Jun. 29, 2016, pp. 1-17 (22 pages total).
Haitam Ben Yahia, "Frame Interpolation using Convolutional Neural Networks on 2D animation", Bachelor Thesis, XP055558906, Jun. 24, 2016, pp. 1-19 (20 pages total).
Slawomir Skoneczny et al., "Classical and neural methods of image sequences interpolation", SPIE—International Society for Optical Engineering Proceedings, Aug. 24, 2001, vol. 4535, pp. 191-204 (15 pages total).
Christos Louizos, et al. Relaxed Quantization for Discretized Neural Networks, Cornell University, Oct. 3, 2018, pp. 1-14.
Mohammad Rastegari et al. "XNOR-Net: ImageNet Classification Using Binary Convolutional Neural Networks" ECCV 2016, Oct. 8-16, 2016, (pp. 1-17).

(56) References Cited

OTHER PUBLICATIONS

Matthieu Courbariaux et al. "BinaryConnect: Training Deep Neural Networks with binary weights during propagations" NIPS 2015, Dec. 7-12, 2015, (pp. 1-9).
International Search Report and Written Opinion (PCT/ISA/210 and PCT/ISA/237), dated Jan. 22, 2020 by International Searching Authority in International Application No. PCT/KR2019/013344.
International Search Report and Written Opinion (PCT/ISA/210 and PCT/ISA/237), dated Aug. 6, 2019 by International Searching Authority in International Application No. PCT/KR2019/004171.
Michalis Giannopoulos et al. "Convolutional Neural Networks for Video Quality Assessment" Sep. 26, 2018, [retrieved from https://arxiv.org/abs/1809.10117v1] (14 pages total).
Patrick Le Callet et al. "A Convolutional Neural Network Approach for Objective Video Quality Assessment" IEEE Transactions on Neural Networks, vol. 17, No. 5, Sep. 2006, (14 pages).
Sehwan Ki et al. "A Study on the Convolution Neural Network based on Blind High Dynamic Range Image Quality Assessment" The Journal of Korean Institute of Communications and Information Sciences, Jan. 2018, (5 pages total).
International Search Report and Written Opinion (PCT/ISA/210 and PCT/ISA/237), dated Jan. 7, 2020 by International Searching Authority in International Application No. PCT/KR2019/012510.
Notice of Amendment Dismissal Communication dated Dec. 17, 2021 issued by the Korean Patent Office in counterpart Korean Application No. 10-2019-0041109.
Communication dated Nov. 8, 2021 issued by the Korean Patent Office in counterpart Korean Application No. 10-2021-0119183.
Notice of Final Rejection Communication dated Dec. 17, 2021 issued by the Korean Patent Office in counterpart Korean Application No. 10-2019-0041109.
Communication dated Oct. 4, 2021 issued by the European Intellectual Property Office in counterpart European Application No. 19873223.2.
Mehdi S. M. Sajjadi et al., "EnhanceNet: Single Image Super-Resolution Through Automated Texture Synthesis", IEEE International Conference on Computer Vision, 2017, 10 pages total, XP033283324.
Tiantong Guo et al., "Deep Learning Based Image Super-Resolution With Coupled Backpropagation", IEEE, 2016, 5 pages total, XP033087061.
Communication dated Feb. 21, 2022 by the Korean Intellectual Property Office for Korean Patent Application No. 10-2019-0041109.
Communication dated Feb. 21, 2022 by the Korean Intellectual Property Office for Korean Patent Application No. 10-2019-0066057.
Communication dated May 24, 2022, issued by the Korean Intellectual Property Office in Korean Patent English Application No. 10-2021-0119183.
Non-Final Office Action dated Oct. 14, 2022 issued by the United States Patent and Trademark Office in U.S. Appl. No. 17/575,691.
Non-Final Office Action dated Sep. 29, 2022 issued by the United States Patent and Trademark Office in U.S. Appl. No. 17/383,533.
Notice of Allowance dated Nov. 21, 2022 issued by the United States Patent and Trademark Office in U.S. Appl. No. 17/286,743.
Communication dated Oct. 24, 2022 issued by the European Patent Office in counterpart European Patent Application No. 20883823.5.
E. Bourtsoulatze et al., "Deep Video Precoding", arXiv:1908.00812v1 [eess.IV], :https://arxiv.org/pdf/1908.00812v1.pdf, XP055970446, Aug. 2, 2019, (14 pages total).
N. Mellempudi et al., "Ternary Neural Networks with Fine-Grained Quantization", arXiv:1705.014623v3 [cs.LG], XP080945917, May 30, 2017, (11 pages total).
Non-Final Office Action dated Nov. 8, 2022 issued by the United States Patent and Trademark Office in U.S. Appl. No. 17/091,889.
H. Kim et al., "Task-Aware Image Downscaling", Proceedings of the European Conference on Computer Vision (ECCV), Sep. 2018, (16 total pages).

A. Lucas et al., "Using Deep Neural Networks for Inverse Problems in Imaging", IEEE Signal Processing Magazine, Digital Object Identifier 10.1109/MSP.2017.2760358, Jan. 2018, (17 total pages).
E. Song et al., "CarvingNet: Content-Guided Seam Carving Using Deep Convolution Neural Network", IEEE Access,vol. 7, Digital Object Identifier 10.1109/ACCESS .2018.2885347, Dec. 6, 2018, (9 total pages).
Communication dated Sep. 29, 2022 issued by the European Patent Office in European Patent Application No. 19873871.8.
D. Sun et al., "Pyramid Embedded Generative Adversarial Network for Automated Font Generation", IEEE, 24th International Conference on Pattern Recognition (ICPR), XP033457235, Aug. 20-24, 2018, (6 total pages).
R. Yasrab et al., "SCNet: A Simplified Encoder-Decoder for CNN for Semantic Segmentation", IEEE, 5th International Conference on Computer Science and Network Technology (ICCSNT), XP033227705, Dec. 10, 2016, (5 total pages).
Communication dated Oct. 5, 2022 issued by the European Patent Office in European Patent Application No. 19873877.5.
Communication dated Oct. 17, 2022 issued by the European Patent Office in European Patent Application No. 19872933.7.
S. Seo et al., "Deep HVS-IQA Net: Human Visual System Inspired Deep Image Quality Assessment Networks", arxiv.org, XP081029095, Feb. 2019, (20 total pages).
W. Kim et al., "Deep Video Quality Assessor: From Spatio-Temporal Visual Sensitivity to a Convolutional Neural Aggregation Network", EECV, LNCS 11205, 2018, (18 total pages).
P. Akyazi et al., "A new objective metric to predict image quality using deep neural networks", 18th International Conference, Oct. 6, 2018, XP047488288, ISBN: 978-3-540-74549-5, (14 total pages).
E. Larson et al., "Most apparent distortion: full-reference image quality assessment and the role of strategy", Journal of Electronics Imaging 19, Proceedings of SPIE,ISBN:978-1-5106-1533-5, Jan. 1, 2010, (21 total pages).
S. Sabour et al., "Dynamic Routing Between Capsules", 31st Conference on Neural Information Processing Systems (NIPS2017), arXiv:1710.09826v2 [cs.CV], XP080921518, Nov. 7, 2017, (11 total pages).
Communication dated Sep. 22, 2022 by the Korean Patent Office in Korean Patent Application No. 10-2019-0062583.
Communication dated Sep. 22, 2022 by the Korean Patent Office in Korean Patent Application No. 10-2019-0077250.
Communication dated Sep. 22, 2022 issued by the Korean Patent Office in Korean Patent Application No. 10-2019-0076569.
T. Stockhammer, "Dynamic adaptive streaming over HTTP: Standards and design principles", ResearchGate, https://www.researchgate.net/publication/221636646, DOI: 10.1145/1943552.1943572, Feb. 2011, (4 pages total).
Y. Sani et al., "Adaptive Bitrate Selection: A Survey", IEEE Communications Survey & Tutorials,vol. 19, No. 4, Fourth Quarter 2017, DOI: 10.1109/COMST.2017.2725241, (30 pages total).
Communication dated Dec. 22, 2022 issued by Intellectual Property India in counterpart Indian Patent Application No. 202117018001.
Non-Final Office Action dated Dec. 22, 2022 issued by the United States Patent and Trademark Office in counterpart U.S. Appl. No. 17/385,995.
Communication dated Dec. 23, 2022 issued by Intellectual Property India in counterpart Indian Patent Application No. 202117016596.
Communication dated Dec. 26, 2022, issued by Intellectual Property India in counterpart Indian Patent Application No. 202117021685.
Communication dated Dec. 28, 2022, issued by Intellectual Property India in counterpart Indian Patent Application No. 202117018613.
Communication dated Dec. 28, 2022 issued by Intellectual Property India in counterpart Indian Patent Application No. 202117019847.
Communication dated Jan. 4, 2023 issued by Intellectual Property India in counterpart Indian Patent Application No. 202117022187.
Indian Office Action, dated Dec. 28, 2022, issued by the Intellectual Property India, Application No. 202117019847.
Indian Office Action, dated Dec. 23, 2022, issued by the Intellectual Property India, Application No. 202117016596.
Indian Office Action, dated Dec. 28, 2022, issued by the Intellectual Property India, Application No. 202117018613.

(56) References Cited

OTHER PUBLICATIONS

Indian Office Action, dated Jan. 4, 2023, issued by the Intellectual Property India, Application No. 202117022187.
Indian Office Action, dated Dec. 26, 2022, issued by the Intellectual Property India, Application No. 202117021685.
European Office Action, dated Mar. 7, 2023, issued by the European Patent Office, Application No. 19873762.9.
Notice of Allowance, dated Feb. 10, 2023, issued by the United States Patent and Trademark Office, U.S. Appl. No. 17/575,691.
Notice of Allowance, dated Jan. 19, 2023, issued by the United States Patent and Trademark Office, U.S. Appl. No. 17/383,533.
Korean Notice of Allowance, dated Jan. 20, 2023, issued by the Korean Patent Office, Application No. 10-2019-0076569.
Communication dated May 15, 2023, from the European Patent Office in European Application No. 19 873 269.5-1208.

\* cited by examiner

FIG. 5

| IMAGE-RELATED INFORMATION | DNN SETTING INFORMATION |
|---|---|
| SD, 10Mbps, AV1 | A DNN SETTING INFORMATION |
| HD, 15Mbps, H.264 | B DNN SETTING INFORMATION |
| Full HD, 20Mbps, HEVC | C DNN SETTING INFORMATION |
| Full HD, 15Mbps, HEVC | D DNN SETTING INFORMATION |

ARTIFICIAL INTELLIGENCE (AI) ENCODING DEVICE AND OPERATING METHOD THEREOF AND AI DECODING DEVICE AND OPERATING METHOD THEREOF

CROSS-REFERENCE TO RELATED APPLICATIONS

This application is based on and claims priority under 35 U.S.C. § 119 to Korean Patent Application No. 10-2018-0125406, filed on Oct. 19, 2018, Korean Patent Application No. 10-2018-0138298, filed on Nov. 12, 2018, Korean Patent Application No. 10-2019-0041099, filed on Apr. 8, 2019, and Korean Patent Application No. 10-2019-0078343, filed on Jun. 28, 2019, in the Korean Intellectual Property Office, the disclosures of which are incorporated by reference herein in their entireties.

BACKGROUND

1. Field

The disclosure relates to an artificial intelligence (AI) encoding apparatus including a Deep Neural Network (DNN) that AI-downscales an image and an operating method thereof, and an AI decoding apparatus including a DNN that AI-upscales an image and an operating method thereof, and more particularly, to an AI encoding apparatus and an operating method thereof, and an AI decoding apparatus and an operating method thereof, all of which are provided for reducing amounts of memory and calculation required to perform a convolution operation in a plurality of convolution layers included in a DNN.

2. Description of Related Art

Images may be encoded by codecs complying with compression standards, for example, Moving Picture Expert Group (MPEG) standards or the like, and then stored in bitstream forms in recording media or transmitted via communication channels.

As hardware capable of reproducing and storing high-resolution/high-quality images have been developed and widely used, there is an increasing need for codecs capable of effectively encoding and decoding high-resolution/high-quality images.

A Convolution Neural Network (CNN) may include one or more convolution layers, and a convolution operation between input data and parameters included in a filter kernel may be performed in each convolution layer. Here, because the parameters may be expressed as real numbers, a large amount of memory nay be required for storing the parameters, and a convolution operation of real numbers may include multiplication and addition operations of real numbers and take a long time.

SUMMARY

According to embodiments, an artificial intelligence (AI) decoding apparatus includes a memory storing one or more instructions, and a processor configured to execute the stored one or more instructions to obtain image data corresponding to a first image that is downscaled from an original image by using first parameters of a first filter kernel included in a first deep neural network (DNN), reconstruct a second image corresponding to the first image, based on the obtained image data, and obtain a third image that is upscaled from the reconstructed second image, by performing an operation between the reconstructed second image and second parameters of a second filter kernel included in a second DNN corresponding to the first DNN. Each of the second parameters is represented by a product of a scale factor and one among integer values, and each of the integer values is 0 or $\pm 2^n$, where n is an integer.

The second DNN may be trained in connection with the first DNN and trained based on a training image that is obtained by training the first DNN.

A first parameter matrix representing the second parameters may be represented by a product of the scale factor and a second parameter matrix including the integer values, the memory may store the scale factor and the second parameter matrix, and the processor may be further configured to execute the stored one or more instructions to obtain the third image by performing a convolution operation between the reconstructed second image and the second parameter matrix and then multiplying a result of the performed convolution operation by the scale factor.

The processor may be further configured to execute the stored one or more instructions to perform the convolution operation by performing a shift operation and an addition operation between a pixel value included in the second image and the second parameter matrix.

According to embodiments, an artificial intelligence (AI) encoding apparatus includes a memory storing one or more instructions, and a processor configured to execute the stored one or more instructions to obtain a first image that is downscaled from an original image, by performing an operation between the original image and first parameters of a filter kernel included in a first deep neural network (DNN), and encode the obtained first image. Each of the first parameters is represented by a product of a scale factor and one among integer values, and each of the integer values is 0 or $\pm 2^n$, where n is an integer, and the first DNN corresponds to a second DNN including a second filter kernel of which second parameters are used to upscale a second image corresponding to the first image.

The first DNN may be trained in connection with the second DNN and trained based on loss information that is obtained by training the second DNN.

The first DNN may be trained based on first loss information that is generated by upscaling in the training of the second DNN, and based on second loss information that is generated by downscaling in training the first DNN.

A first parameter matrix representing the first parameters may be represented by a product of the scale factor and a second parameter matrix including the integer values, the memory may store the scale factor and the second parameter matrix, and the processor may be further configured to execute the stored one or more instructions to obtain the first image by performing a convolution operation between the original image and the second parameter matrix and then multiplying a result of the performed convolution operation by the scale factor.

The processor may be further configured to execute the stored one or more instructions to perform the convolution operation by performing a shift operation and an addition operation between a pixel value included in the original image and the second parameter matrix.

According to embodiments, an operating method of an artificial intelligence (AI) decoding apparatus, includes obtaining image data corresponding to a first image that is downscaled from an original image by using first parameters of a first filter kernel included in a first deep neural network (DNN), reconstructing a second image corresponding to the first image, based on the obtained image data, and obtaining a third image that is upscaled from the reconstructed second image, by performing an operation between the reconstructed second image and second parameters of a second filter kernel included in a second DNN corresponding to the first DNN. Each of the second parameters is represented by a product of a scale factor and one among integer values, and each of the integer values is 0 or $\pm 2^n$, where n is an integer.

The second DNN may be trained in connection with the first DNN and trained based on a training image that is obtained by training the first DNN.

A first parameter matrix representing the second parameters may be represented by a product of the scale factor and a second parameter matrix including the integer values, and the obtaining of the third image may include obtaining the third image by performing a convolution operation between the reconstructed second image and the second parameter matrix and then multiplying a result of the performed convolution operation by the scale factor.

The obtaining of the third image may include performing the convolution operation by performing a shift operation and an addition operation between a pixel value included in the second image and the second parameter matrix.

According to embodiments, an operating method of an artificial intelligence (AI) encoding apparatus, includes obtaining a first image that is downscaled from an original image, by performing an operation between the original image and first parameters of a filter kernel included in a first deep neural network (DNN), and encoding the obtained first image. Each of the first parameters is represented by a product of a scale factor and one among integer values, and each of the integer values is 0 or $\pm 2^n$, where n is an integer, and the first DNN corresponds to a second DNN including a second filter kernel of which second parameters are used to upscale a second image corresponding to the first image.

The first DNN may be trained in connection with the second DNN and trained based on loss information that is obtained by training the second DNN.

The first DNN may be trained based on first loss information that is generated by upscaling in the training of the second DNN, and based on second loss information that is generated by downscaling in training the first DNN.

A first parameter matrix representing the first parameters may be represented by a product of the scale factor and a second parameter matrix including the integer values, and the obtaining of the first image may include obtaining the first image by performing a convolution operation between the original image and the second parameter matrix and then multiplying a result of the performed convolution operation by the scale factor.

The obtaining of the first image may include performing the convolution operation by performing a shift operation and an addition operation between a pixel value that is included in the original image and the second parameter matrix.

According to embodiments, a method of training a first deep neural network (DNN) and a second DNN, includes applying a first noise function to first parameters of a first filter kernel included in the first DNN, to obtain second parameters, obtaining a first training image that is downscaled from an original training image, by converting the obtained second parameters into a first product of a first scale factor and one among integer values and then performing a first operation between the first product and the original training image, and obtaining a reduced training image that is downscaled from the original training image.

The method further includes obtaining first loss information, based on the obtained first training image and the obtained reduced training image, applying a second noise function to third parameters of a second filter kernel included in the second DNN, to obtain fourth parameters, and obtaining a second training image that is upscaled from the obtained first training image, by converting the obtained fourth parameters into a second product of a second scale factor and one among the integer values and then performing a second operation between the second product and the obtained first training image. The method further includes obtaining second loss information, based on the obtained second training image and the original training image, updating the first parameters, based on the obtained first loss information and the obtained second loss information, and updating the third parameters, based on the obtained second loss information.

The method may further include converting a first parameter matrix representing the updated first parameters, into a third product of a third scale factor and a second parameter matrix including the integer values, storing the third scale factor and the second parameter matrix, converting a third parameter matrix representing the updated third parameters, into a fourth product of a fourth scale factor and a fourth parameter matrix including the integer values, and storing the fourth scale factor and the fourth parameter matrix.

Each of the first noise function and the second noise function may include a Gaussian function with an average value of 0.

Each of the integer values may be 0 or $\pm 2^n$, where n is an integer.

The obtaining of the first training image may include converting a first parameter matrix representing the obtained second parameters, into a third product of the first scale factor and a second parameter matrix including the integer values, and obtaining the first training image by performing a convolution operation between the original training image and the second parameter matrix and then multiplying a result of the performed convolution operation by the first scale factor.

The obtaining of the first training image may include performing the convolution operation by performing a shift operation and an addition operation between the original training image and the second parameter matrix.

The obtaining of the second training image may include converting a first parameter matrix representing the obtained fourth parameters, into a third product of the second scale factor and a second parameter matrix including the integer values, and obtaining the second training image by performing a convolution operation between the obtained first training image and the second parameter matrix and then multiplying a result of the performed convolution operation by the second scale factor.

The obtaining of the second training image may include performing the convolution operation by performing a shift operation and an addition operation between the obtained first training image and the second parameter matrix.

According to embodiments, an artificial intelligence (AI) decoding apparatus includes a memory storing one or more instructions, and a processor configured to execute the stored one or more instructions to obtain image data corresponding to a first image that is downscaled from an original image by using first parameters of a first deep neural network (DNN), reconstruct a second image corresponding to the first image, based on the obtained image data, and obtain a third image that is upscaled from the reconstructed second image by using second parameters of a second DNN.

The second parameters of the second DNN are trained based on an output of training the first DNN.

Each of the first parameters and the second parameters may be represented by a product of a scale factor and one among integer values, and each of the integer values may be 0 or $\pm 2^n$, where n is an integer.

The first parameters of the first DNN may be trained based on a first loss between a reduced training image of an original training image and a first training image that is obtained by the training of the first DNN with the original training image, and the second parameters of the second DNN may be trained based a second loss between the original training image and a second training image that is obtained by training the second DNN with the first training image.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects, features, and advantages of embodiments of the disclosure will be more apparent from the following description taken in conjunction with the accompanying drawings, in which:

FIG. 5 is a table showing a mapping relationship between several pieces of image-related information and several pieces of DNN setting information;

DETAILED DESCRIPTION

Figure 1:
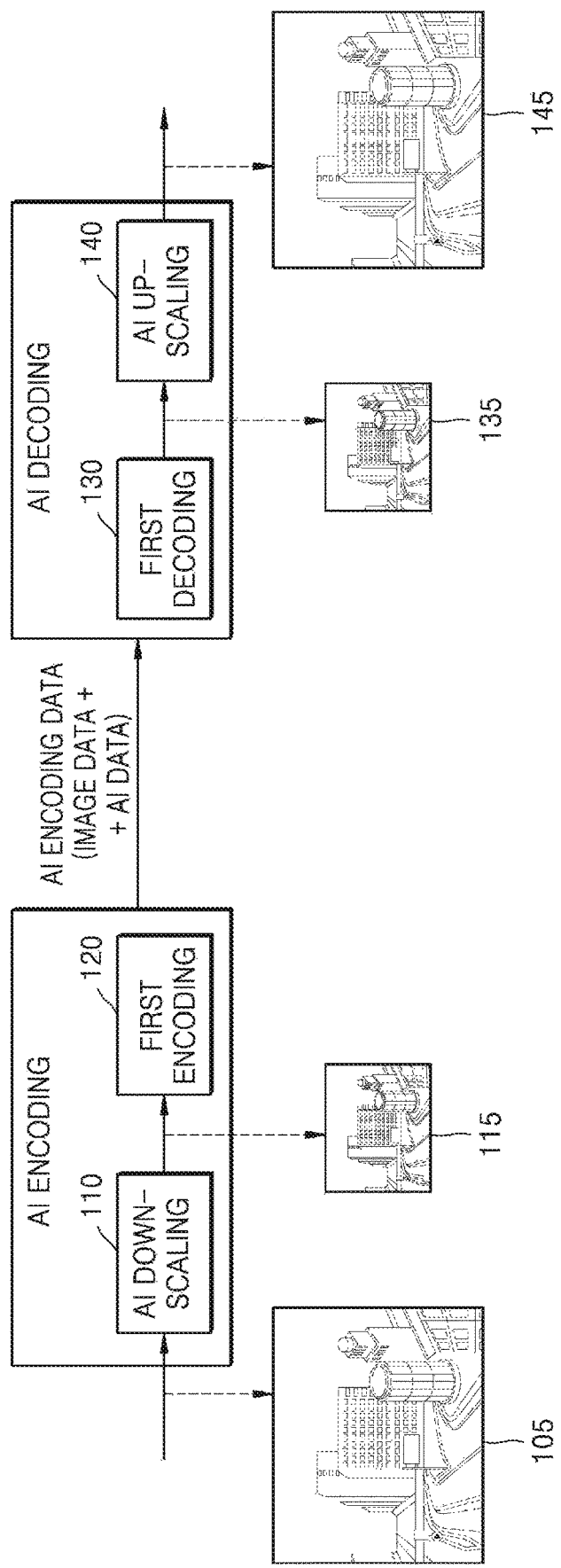
FIG. 1 is a diagram for describing an artificial intelligence (AI) encoding process and an AI decoding process, according to embodiments.

Embodiments of the disclosure provide an artificial intelligence (AI) encoding apparatus and an operating method thereof, which allow a reduction in amounts of memory and calculation for a convolution operation performed by a first deep neural network (DNN) included in the AI encoding apparatus while maintaining AI downscaling performance of the first DNN.

In addition, the embodiments of the disclosure also provide an AI decoding apparatus and an operating method thereof, which allow a reduction in amounts of memory and calculation for a convolution operation performed by a second DNN included in the AI decoding apparatus while maintaining AI upscaling performance of the second DNN.

As the disclosure allows for various changes and numerous examples, the embodiments will be illustrated in the drawings and described in detail in the written description. However, this is not intended to limit the disclosure to modes of practice, and it will be understood that all changes, equivalents, and substitutes that do not depart from the spirit and technical scope of the disclosure are encompassed in the disclosure.

In the description of the embodiments, detailed explanations of related art are omitted when it is deemed that they may unnecessarily obscure the essence of the disclosure. Also, numbers (for example, a first, a second, and the like) used in the description of the specification are identifier codes for distinguishing one element from another.

Also, in the present specification, it will be understood that when elements are "connected" or "coupled" to each other, the elements may be directly connected or coupled to each other, but may alternatively be connected or coupled to each other with an intervening element therebetween, unless specified otherwise.

In the present specification, regarding an element represented as a "unit" or a "module," two or more elements may be combined into one element or one element may be divided into two or more elements according to subdivided functions. In addition, each element described hereinafter may additionally perform some or all of functions performed by another element, in addition to main functions of itself, and some of the main functions of each element may be performed entirely by another component.

Also, in the present specification, an 'image' or a 'picture' may denote a still image, a moving image including a plurality of consecutive still images (or frames), or a video.

Also, in the present specification, a deep neural network (DNN) is a representative example of an artificial neural network model simulating brain nerves, and is not limited to an artificial neural network model using an algorithm.

Also, in the present specification, a 'parameter' is a value used in an operation process of each layer forming a neural network, and for example, may include a weight used when an input value is applied to an operation expression. Here, the parameter may be expressed in a matrix form. The parameter is a value set as a result of training, and may be updated through separate training data when necessary.

Also, in the present specification, a 'first DNN' indicates a DNN used for artificial intelligence (AI) down-scaling an image, and a 'second DNN' indicates a DNN used for AI up-scaling an image.

Also, in the present specification, 'DNN setting information' includes information related to an element constituting a DNN. 'DNN setting information' includes the parameter described above as information related to the element constituting the DNN. The first DNN or the second DNN may be set by using the DNN setting information.

Also, in the present specification, an 'original image' denotes an image to be an object of AI encoding, and a 'first image' denotes an image obtained as a result of performing AI down-scaling on the original image during an AI encoding process. Also, a 'second image' denotes an image obtained via first decoding during an AI decoding process, and a 'third image' denotes an image obtained by AI up-scaling the second image during the AI decoding process.

Also, in the present specification, 'AI down-scale' denotes a process of decreasing resolution of an image based on AI, and 'first encoding' denotes an encoding process according to an image compression method based on frequency transformation. Also, 'first decoding' denotes a decoding process according to an image reconstruction method based on frequency transformation, and 'AI up-scale' denotes a process of increasing resolution of an image based on AI.

Throughout the disclosure, the expression "at least one of a, b or c" indicates only a, only b, only c, both a and b, both a and c, both b and c, all of a, b, and c, or variations thereof.

FIG. 1 is a diagram for describing an AI encoding process and an AI decoding process, according to embodiments.

As described above, when resolution of an image remarkably increases, the throughput of information for encoding and decoding the image is increased, and accordingly, a method for improving efficiency of encoding and decoding of an image is required.

As shown in FIG. 1, according to embodiments of the disclosure, a first image 115 is obtained by performing AI down-scaling 110 on an original image 105 having high resolution. Then, first encoding 120 and first decoding 130 are performed on the first image 115 having relatively low resolution, and thus a bitrate may be largely reduced compared to when the first encoding and the first decoding are performed on the original image 105.

In FIG. 1, the first image 115 is obtained by performing the AI down-scaling 110 on the original image 105 and the first encoding 120 is performed on the first image 115 during the AI encoding process, according to embodiments. During the AI decoding process, AI encoding data including AI data and image data, which are obtained as a result of AI encoding is received, a second image 135 is obtained via the first decoding 130, and a third image 145 is obtained by performing AI up-scaling 140 on the second image 135.

Referring to the AI encoding process in detail, when the original image 105 is received, the AI down-scaling 110 is performed on the original image 105 to obtain the first image 115 of a resolution or a quality. Here, the AI down-scaling 110 is performed based on AI, and AI for the AI down-scaling 110 needs to be trained jointly with AI for the AI up-scaling 140 of the second image 135. This is because, when the AI for the AI down-scaling 110 and the AI for the AI up-scaling 140 are separately trained, a difference between the original image 105 that is an object of AI encoding and the third image 145 reconstructed through AI decoding is increased.

In embodiments of the disclosure, the AI data may be used to maintain such a joint relationship during the AI encoding process and the AI decoding process. Accordingly, the AI data obtained through the AI encoding process may include information indicating an up-scaling target, and during the AI decoding process, the AI up-scaling 140 is performed on the second image 135 according to the up-scaling target verified based on the AI data.

The AI for the AI down-scaling 110 and the AI for the AI up-scaling 140 may be embodied as a DNN. As will be described later with reference to FIG. 9, because a first DNN and a second DNN are jointly trained by sharing loss information under a target, an AI encoding apparatus may provide target information used during joint training of the first DNN and the second DNN to an AI decoding apparatus, and the AI decoding apparatus may perform the AI up-scaling 140 on the second image 135 to target resolution based on the provided target information.

Regarding the first encoding 120 and the first decoding 130 of FIG. 1, information amount of the first image 115 obtained by performing AI down-scaling 110 on the original image 105 may be reduced through the first encoding 120. The first encoding 120 may include a process of generating prediction data by predicting the first image 115, a process of generating residual data corresponding to a difference between the first image 115 and the prediction data, a process of transforming the residual data of a spatial domain component to a frequency domain component, a process of quantizing the residual data transformed to the frequency domain component, and a process of entropy-encoding the quantized residual data. Such first encoding 120 may be performed via one of image compression methods using frequency transformation, such as MPEG-2, H.264 Advanced Video Coding (AVC), MPEG-4, High Efficiency Video Coding (HEVC), VC-1, VP8, VP9, and AOMedia Video 1 (AV1).

The second image 135 corresponding to the first image 115 may be reconstructed by performing the first decoding 130 on the image data. The first decoding 130 may include a process of generating the quantized residual data by entropy-decoding the image data, a process of inverse-quantizing the quantized residual data, a process of transforming the residual data of the frequency domain component to the spatial domain component, a process of generating the prediction data, and a process of reconstructing the second image 135 by using the prediction data and the residual data. Such first decoding 130 may be performed via an image reconstruction method corresponding to one of image compression methods using frequency transformation, such as MPEG-2, H.264 AVC, MPEG-4, HEVC, VC-1, VP8, VP9, and AV1, which is used in the first encoding 120.

The AI encoding data obtained through the AI encoding process may include the image data obtained as a result of performing the first encoding 120 on the first image 115, and the AI data related to the AI down-scaling 110 of the original image 105. The image data may be used during the first decoding 130 and the AI data may be used during the AI up-scaling 140.

The image data may be transmitted in a form of a bitstream. The image data may include data obtained based on pixel values in the first image 115, for example, residual data that is a difference between the first image 115 and prediction data of the first image 115. Also, the image data includes information used during the first encoding 120 performed on the first image 115. For example, the image data may include prediction mode information, motion information, and information related to quantization parameter used during the first encoding 120. The image data may be generated according to a rule, for example, according to a syntax, of an image compression method used during the first encoding 120, among MPEG-2, H.264 AVC, MPEG-4, HEVC, VC-1, VP8, VP9, and AV1.

The AI data is used in the AI up-scaling 140 based on the second DNN. As described above, because the first DNN and the second DNN are jointly trained, the AI data includes information enabling the AI up-scaling 140 to be performed accurately on the second image 135 through the second DNN. During the AI decoding process, the AI up-scaling 140 may be performed on the second image 135 to have targeted resolution and/or quality, based on the AI data.

The AI data may be transmitted together with the image data in a form of a bitstream. Alternatively, according to embodiments, the AI data may be transmitted separately from the image data, in a form of a frame or a packet. The AI data and the image data obtained as a result of the AI encoding may be transmitted through the same network or through different networks.

Figure 2:
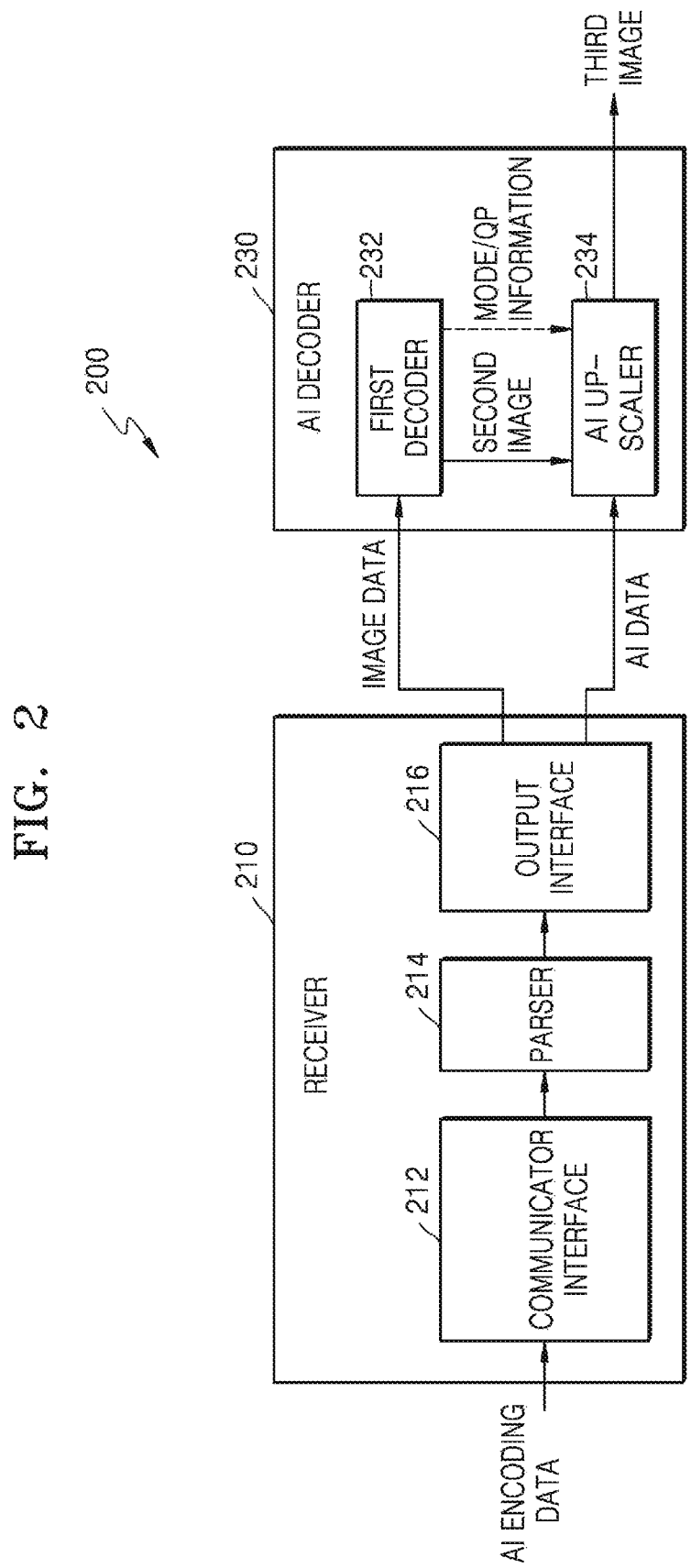
FIG. 2 is a block diagram of a configuration of an AI decoding apparatus according to embodiments.

FIG. 2 is a block diagram of a configuration of an AI decoding apparatus 200 according to embodiments.

Referring to FIG. 2, the AI decoding apparatus 200 according to embodiments may include a receiver 210 and an AI decoder 230. The receiver 210 may include a communication interface 212, a parser 214, and an output interface 216. The AI decoder 230 may include a first decoder 232 and an AI up-scaler 234.

The receiver 210 receives and parses AI encoding data obtained as a result of AI encoding, and distinguishably outputs image data and AI data to the AI decoder 230.

The communication interface 212 receives the AI encoding data obtained as the result of AI encoding through a network. The AI encoding data obtained as the result of performing AI encoding includes the image data and the AI data. The image data and the AI data may be received through a same type of network or different types of networks.

The parser 214 receives the AI encoding data received through the communication interface 212 and parses the AI encoding data to distinguish the image data and the AI data. For example, the parser 214 may distinguish the image data and the AI data by reading a header of data obtained from the communication interface 212. According to embodiments, the parser 214 distinguishably transmits the image data and the AI data to the output interface 216 via the header of the data received through the communication interface 212, and the output interface 216 transmits the distinguished image data and AI data respectively to the first decoder 232 and the AI up-scaler 234. At this time, it may be verified that the image data included in the AI encoding data is image data generated via a codec (for example, MPEG-2, H.264 AVC, MPEG-4, HEVC, VC-1, VP8, VP9, or AV1). In this case, corresponding information may be transmitted to the first decoder 232 through the output interface 216 such that the image data is processed via the verified codec.

According to embodiments, the AI encoding data parsed by the parser 214 may be obtained from a data storage medium including a magnetic medium such as a hard disk, a floppy disk, or a magnetic tape, an optical recording medium such as CD-ROM or DVD, or a magneto-optical medium such as a floptical disk.

The first decoder 232 reconstructs the second image 135 corresponding to the first image 115, based on the image data. The second image 135 obtained by the first decoder 232 is provided to the AI up-scaler 234. According to embodiments, first decoding related information, such as prediction mode information, motion information, quantization parameter (QP) information, or the like included in the image data may be further provided to the AI up-scaler 234.

Upon receiving the AI data, the AI up-scaler 234 performs AI up-scaling on the second image 135, based on the AI data. According to embodiments, the AI up-scaling may be performed by further using the first decoding related information, such as the prediction mode information, the quantization parameter information, or the like included in the image data.

The receiver 210 and the AI decoder 230 according to embodiments are described as individual devices, but may be implemented through one processor. In this case, the receiver 210 and the AI decoder 230 may be implemented through an dedicated processor or through a combination of software and general-purpose processor such as application processor (AP), central processing unit (CPU) or graphic processing unit (GPU). The dedicated processor may be implemented by including a memory for implementing embodiments of the disclosure or by including a memory processor for using an external memory.

Also, the receiver 210 and the AI decoder 230 may be configured by a plurality of processors. In this case, the receiver 210 and the AI decoder 230 may be implemented through a combination of dedicated processors or through a combination of software and general-purpose processors such as AP, CPU or GPU. Similarly, the AI up-scaler 234 and the first decoder 232 may be implemented by different processors.

The AI data provided to the AI up-scaler 234 includes information enabling the second image 135 to be processed via AI up-scaling. Here, an up-scaling target may correspond to down-scaling of a first DNN. Accordingly, the AI data includes information for verifying a down-scaling target of the first DNN.

Examples of the information included in the AI data include difference information between resolution of the original image 105 and resolution of the first image 115, and information related to the first image 115.

The difference information may be expressed as information about a resolution conversion degree of the first image 115 compared to the original image 105 (for example, resolution conversion rate information). Also, because the resolution of the first image 115 is verified through the resolution of the reconstructed second image 135 and the resolution conversion degree is verified accordingly, the difference information may be expressed only as resolution information of the original image 105. Here, the resolution information may be expressed as vertical/horizontal sizes or as a ratio (16:9, 4:3, or the like) and a size of one axis. Also, when there is pre-set resolution information, the resolution information may be expressed in a form of an index or flag.

The information related to the first image 115 may include information about either one or both of a bitrate of the image data obtained as the result of performing first encoding on the first image 115 and a codec type used during the first encoding of the first image 115.

The AI up-scaler 234 may determine the up-scaling target of the second image 135, based on either one or both of the difference information and the information related to the first image 115, which are included in the AI data. The up-scaling target may indicate, for example, to what degree resolution is to be up-scaled for the second image 135. When the up-scaling target is determined, the AI up-scaler 234 performs AI up-scaling on the second image 135 through a second DNN to obtain the third image 145 corresponding to the up-scaling target.

Before describing a method, performed by the AI up-scaler 234, of performing AI up-scaling on the second image 135 according to the up-scaling target, an AI up-scaling process through the second DNN will be described with reference to FIGS. 3 and 4.

Figure 3:
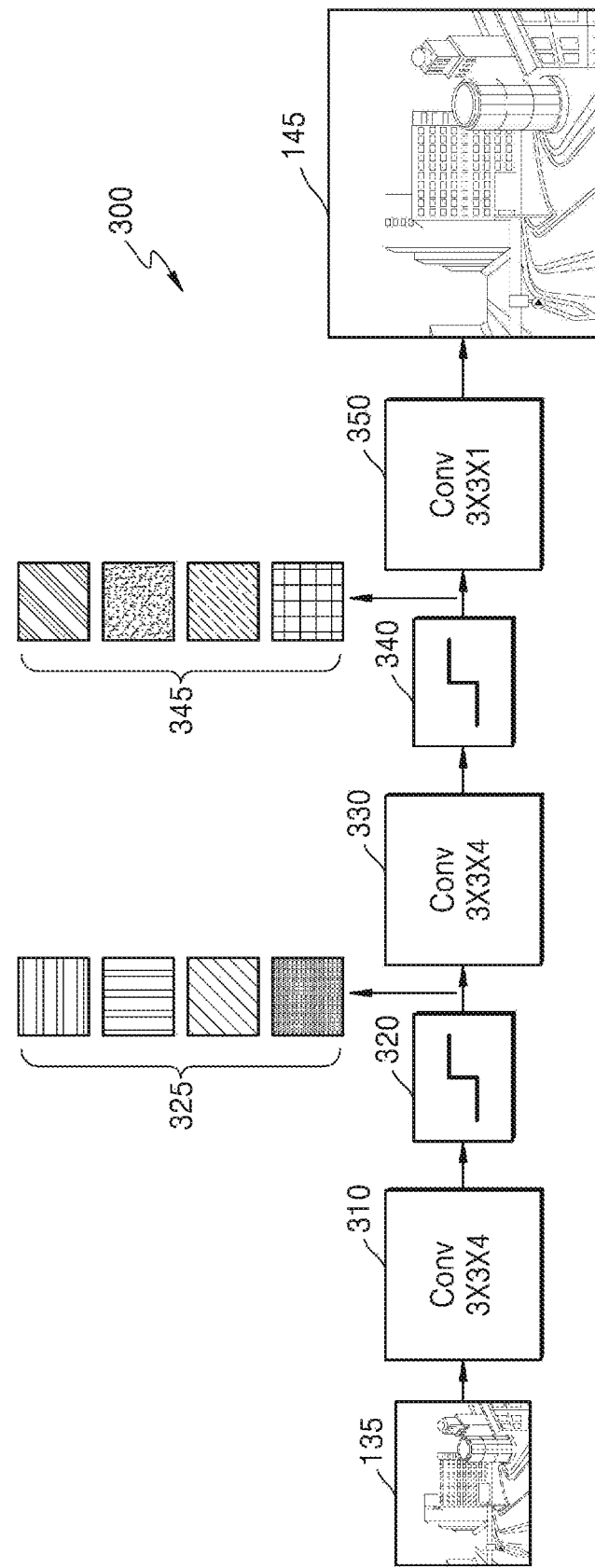
FIG. 3 is a diagram showing a second deep neural network (DNN) for performing AI up-scaling on a second image.
Figure 4:
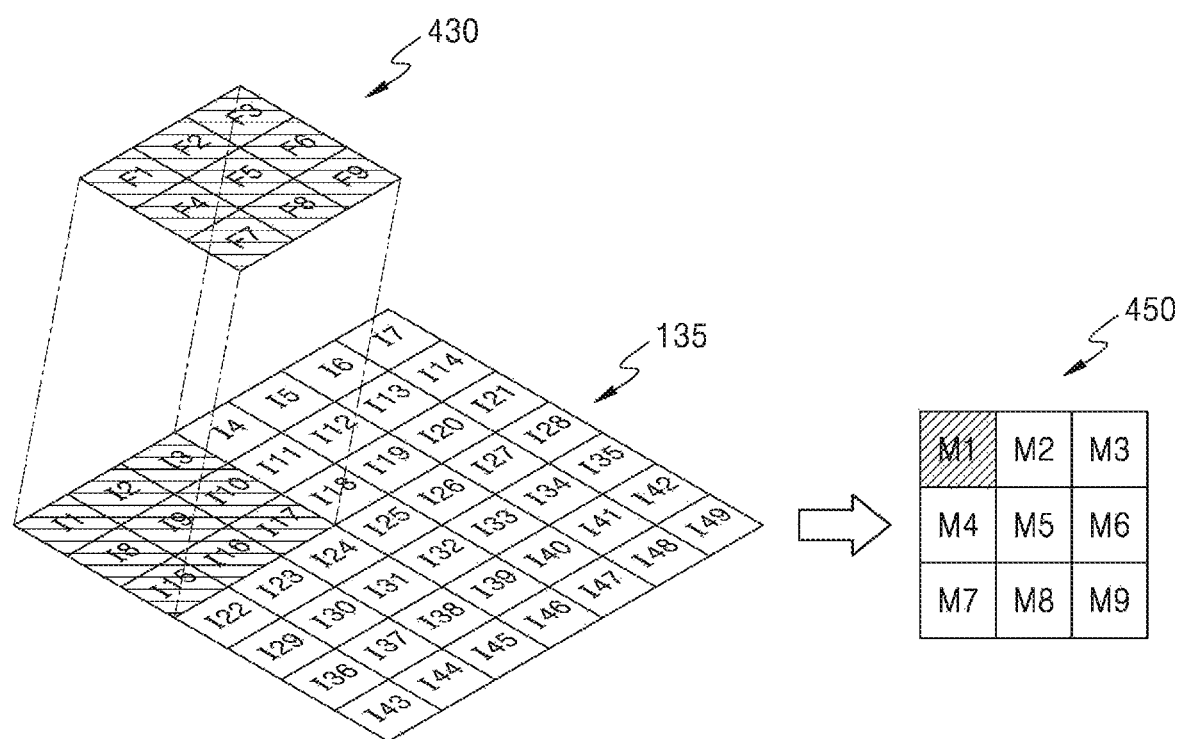
FIG. 4 is a diagram for describing a convolution operation by a convolution layer.

FIG. 3 is a diagram showing a second DNN 300 for performing AI up-scaling on the second image 135, and FIG. 4 is a diagram for describing a convolution operation in a first convolution layer 310 of FIG. 3.

As shown in FIG. 3, the second image 135 is input to the first convolution layer 310. 3×3×4 indicated in the first convolution layer 310 shown in FIG. 3 indicates that a convolution process is performed on one input image by using four filter kernels having a size of 3×3. Four feature maps are generated by the four filter kernels as a result of the convolution process. Each feature map indicates inherent characteristics of the second image 135. For example, each feature map may represent a vertical direction characteristic, a horizontal direction characteristic, or an edge characteristic, etc. of the second image 135.

A convolution operation in the first convolution layer 310 will be described in detail with reference to FIG. 4.

One feature map 450 may be generated through multiplication and addition between parameters of a filter kernel 430 having a size of 3×3 used in the first convolution layer 310 and corresponding pixel values in the second image 135. Because four filter kernels are used in the first convolution layer 310, four feature maps may be generated through the convolution operation using the four filter kernels.

I1 through I49 indicated in the second image 135 in FIG. 4 indicate pixels in the second image 135, and F1 through F9 indicated in the filter kernel 430 indicate parameters of the filter kernel 430. Also, M1 through M9 indicated in the feature map 450 indicate samples of the feature map 450.

In FIG. 4, the second image 135 includes 49 pixels, but the number of pixels is only an example and when the second image 135 has a resolution of 4 K, the second image 135 may include, for example, 3840×2160 pixels.

During a convolution operation process, pixel values of I1, I2, I3, I8, I9, I10, I15, I16, and I17 of the second image 135 and F1 through F9 of the filter kernels 430 are respectively multiplied, and a value of combination (for example, addition) of result values of the multiplication may be assigned as a value of M1 of the feature map 450. When a stride of the convolution operation is 2, pixel values of I3, I4, I5, I10, I11, I12, I17, I18, and I19 of the second image 135 and F1 through F9 of the filter kernels 430 are respectively multiplied, and the value of the combination of the result values of the multiplication may be assigned as a value of M2 of the feature map 450.

While the filter kernel 430 moves along the stride to the last pixel of the second image 135, the convolution operation is performed between the pixel values in the second image 135 and the parameters of the filter kernel 430, and thus the feature map 450 having a size may be generated.

As described above, the convolution operation requires a multiplication operation for multiplying the pixel values included in the input image 410 by the parameters of the filter kernel 430 and an addition operation for combining result values of the multiplication operation. Here, a multiplication operation of real numbers requires more amounts of memory and calculation than a multiplication, shift, or addition operation of integers.

Therefore, to reduce amounts of memory and calculation required to perform the convolution operation, the second DNN may be trained, wherein the parameters included in the filter kernel used in the second DNN are represented by a product of a scale factor and an integer.

According to embodiments, values of parameters of a second DNN, for example, values of parameters of a filter kernel used in convolution layers of the second DNN (for example, F1 through F9 of the filter kernel 430), may be optimized through joint training of a first DNN and the second DNN. As described above, the AI up-scaler 234 may determine an up-scaling target corresponding to a down-scaling target of the first DNN based on AI data, and determine parameters corresponding to the determined up-scaling target as the parameters of the filter kernel used in the convolution layers of the second DNN.

Convolution layers included in the first DNN and the second DNN may perform processes according to the convolution operation process described with reference to FIG. 4, but the convolution operation process described with reference to FIG. 4 is only an example and is not limited thereto.

Referring back to FIG. 3, the feature maps output from the first convolution layer 310 may be input to a first activation layer 320.

The first activation layer 320 may assign a non-linear feature to each feature map. The first activation layer 320 may include a sigmoid function, a Tanh function, a rectified linear unit (ReLU) function, or the like, but is not limited thereto.

The first activation layer 320 assigning the non-linear feature indicates that at least one sample value of the feature map, which is an output of the first convolution layer 310, is changed. Here, the change is performed by applying the non-linear feature.

The first activation layer 320 determines whether to transmit sample values of the feature maps output from the first convolution layer 310 to a second convolution layer 330. For example, some of the sample values of the feature maps are activated by the first activation layer 320 and transmitted to the second convolution layer 330, and some of the sample values are deactivated by the first activation layer 320 and not transmitted to the second convolution layer 330. The intrinsic characteristics of the second image 135 represented by the feature maps are emphasized by the first activation layer 320.

Feature maps 325 output from the first activation layer 320 are input to the second convolution layer 330. One of the feature maps 325 shown in FIG. 3 is a result of processing the feature map 450 described with reference to FIG. 4 in the first activation layer 320.

3×3×4 indicated in the second convolution layer 330 indicates that a convolution process is performed on the feature maps 325 by using four filter kernels having a size of 3×3. An output of the second convolution layer 330 is input to a second activation layer 340. The second activation layer 340 may assign a non-linear feature to input data.

Feature maps 345 output from the second activation layer 340 are input to a third convolution layer 350. 3×3×1 indicated in the third convolution layer 350 shown in FIG. 3 indicates that a convolution process is performed to generate one output image by using one filter kernel having a size of 3×3. The third convolution layer 350 is a layer for outputting a final image and generates one output by using one filter kernel. According to embodiments of the disclosure, the third convolution layer 350 may output the third image 145 as a result of a convolution operation.

There may be a plurality of pieces of DNN setting information indicating the numbers of filter kernels of the first, second, and third convolution layers 310, 330, and 350 of the second DNN 300, a parameter of filter kernels of the first, second, and third convolution layers 310, 330, and 350 of the second DNN 300, and the like, as will be described later, and the plurality of pieces of DNN setting information may be connected to a plurality of pieces of DNN setting information of a first DNN. The connection between the plurality of pieces of DNN setting information of the second DNN and the plurality of pieces of DNN setting information of the first DNN may be realized via joint training of the first DNN and the second DNN.

In FIG. 3, the second DNN 300 includes three convolution layers (the first, second, and third convolution layers 310, 330, and 350) and two activation layers (the first and second activation layers 320 and 340), but this is only an example, and the numbers of convolution layers and activation layers may vary according to embodiments. Also, according to embodiments, the second DNN 300 may be implemented as a recurrent neural network (RNN). In this case, a convolutional neural network (CNN) structure of the second DNN 300 according to embodiments of the disclosure is changed to an RNN structure.

According to embodiments, the AI up-scaler 234 may include at least one arithmetic logic unit (ALU) for the convolution operation and the operation of the activation layer described above. The ALU may be implemented as a processor. For the convolution operation, the ALU may include a multiplier that performs multiplication between sample values of the second image 135 or the feature map output from previous layer and sample values of the filter kernel, and an adder that adds result values of the multiplication. Also, for the operation of the activation layer, the ALU may include a multiplier that multiplies an input sample value by a weight used in a pre-determined sigmoid function, a Tanh function, or an ReLU function, and a comparator that compares a multiplication result and a value to determine whether to transmit the input sample value to a next layer.

Hereinafter, a method, performed by the AI up-scaler 234, of performing the AI up-scaling on the second image 135 according to the up-scaling target will be described.

According to embodiments, the AI up-scaler 234 may store a plurality of pieces of DNN setting information settable in a second DNN.

Here, the DNN setting information may include information about any one or any combination of the number of convolution layers included in the second DNN, the number of filter kernels for each convolution layer, and a parameter of each filter kernel. The plurality of pieces of DNN setting information may respectively correspond to various up-scaling targets, and the second DNN may operate based on DNN setting information corresponding to an up-scaling target. The second DNN may have different structures based on the DNN setting information. For example, the second DNN may include three convolution layers based on any piece of DNN setting information, and may include four convolution layers based on another piece of DNN setting information.

According to embodiments, the DNN setting information may only include a parameter of a filter kernel used in the second DNN. In this case, the structure of the second DNN does not change, but only the parameter of the internal filter kernel may change based on the DNN setting information.

The AI up-scaler 234 may obtain the DNN setting information for performing AI up-scaling on the second image 135, among the plurality of pieces of DNN setting information. Each of the plurality of pieces of DNN setting information used at this time is information for obtaining the third image 145 of pre-determined resolution and/or pre-determined quality, and is trained jointly with a first DNN.

For example, one piece of DNN setting information among the plurality of pieces of DNN setting information may include information for obtaining the third image 145 of resolution twice higher than resolution of the second image 135, for example, the third image 145 of 4 K (4096×2160) twice higher than 2 K (2048×1080) of the second image 135, and another piece of DNN setting information may include information for obtaining the third image 145 of resolution four times higher than the resolution of the second image 135, for example, the third image 145 of 8 K (8192×4320) four times higher than 2 K (2048×1080) of the second image 135.

Figure 6:
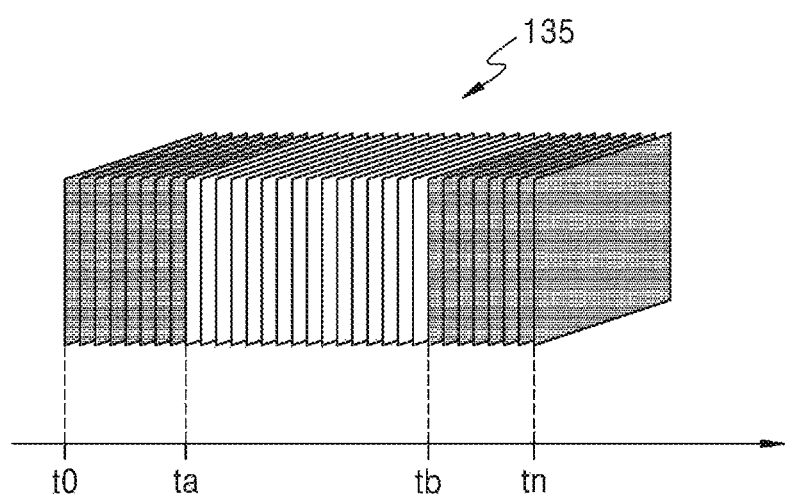
FIG. 6 is a diagram showing a second image including a plurality of frames.

Each of the plurality of pieces of DNN setting information is obtained jointly with DNN setting information of the first DNN of an AI encoding apparatus 600 of FIG. 6, and the AI up-scaler 234 obtains one piece of DNN setting information among the plurality of pieces of DNN setting information according to an enlargement ratio corresponding to a reduction ratio of the DNN setting information of the first DNN. In this regard, the AI up-scaler 234 may verify information of the first DNN. In order for the AI up-scaler 234 to verify the information of the first DNN, the AI decoding apparatus 200 according to embodiments receives AI data including the information of the first DNN from the AI encoding apparatus 600.

In other words, the AI up-scaler 234 may verify information targeted by DNN setting information of the first DNN used to obtain the first image 115 and obtain the DNN setting information of the second DNN trained jointly with the DNN setting information of the first DNN, by using information received from the AI encoding apparatus 600.

When DNN setting information for performing the AI up-scaling on the second image 135 is obtained from among the plurality of pieces of DNN setting information, input data may be processed based on the second DNN operating according to the obtained DNN setting information.

For example, when any one piece of DNN setting information is obtained, the number of filter kernels included in each of the first, second, and third convolution layers 310, 330, and 350 of the second DNN 300 of FIG. 3, and the parameters of the filter kernels are set to values included in the obtained DNN setting information.

Parameters of a filter kernel of 3×3 used in any one convolution layer of the second DNN of FIG. 4 are set to {1, 1, 1, 1, 1, 1, 1, 1, 1}, and when DNN setting information is changed afterwards, the parameters are replaced by {2, 2, 2, 2, 2, 2, 2, 2, 2} that are parameters included in the changed DNN setting information.

The AI up-scaler 234 may obtain the DNN setting information for AI up-scaling from among the plurality of pieces of DNN setting information, based on information included in the AI data, and the AI data used to obtain the DNN setting information will now be described.

According to embodiments, the AI up-scaler 234 may obtain the DNN setting information for AI up-scaling from among the plurality of pieces of DNN setting information, based on difference information included in the AI data. For example, when it is verified that the resolution (for example, 4 K (4096×2160)) of the original image 105 is twice higher than the resolution (for example, 2 K (2048×1080)) of the first image 115, based on the difference information, the AI up-scaler 234 may obtain the DNN setting information for increasing the resolution of the second image 135 two times.

According to embodiments, the AI up-scaler 234 may obtain the DNN setting information for AI up-scaling the second image 135 from among the plurality of pieces of DNN setting information, based on information related to the first image 115 included in the AI data. The AI up-scaler 234 may pre-determine a mapping relationship between image-related information and DNN setting information, and obtain the DNN setting information mapped to the information related to the first image 115.

FIG. 5 is a table showing a mapping relationship between several pieces of image-related information and several pieces of DNN setting information.

Through embodiments according to FIG. 5, it will be determined that AI encoding and AI decoding processes according to embodiments of the disclosure do not only consider a change of resolution. As shown in FIG. 5, DNN setting information may be selected considering resolution, such as standard definition (SD), high definition (HD), or full HD, a bitrate, such as 10 Mbps, 15 Mbps, or 20 Mbps, and codec information, such as AV1, H.264, or HEVC, individually or collectively. For such consideration of the resolution, the bitrate and the codec information, training in consideration of each element may be jointly performed with encoding and decoding processes during an AI training process (see FIG. 9).

Accordingly, when a plurality of pieces of DNN setting information are provided based on image-related information including a codec type, resolution of an image, and the like, as shown in FIG. 5 according to training, the DNN setting information for AI up-scaling the second image 135 may be obtained based on the information related to the first image 115 received during the AI decoding process.

In other words, the AI up-scaler 234 is capable of using DNN setting information according to image-related information by matching the image-related information at the left of a table of FIG. 5 and the DNN setting information at the right of the table.

As shown in FIG. 5, when it is verified, from the information related to the first image 115, that the resolution of the first image 115 is SD, a bitrate of image data obtained as a result of performing first encoding on the first image 115 is 10 Mbps, and the first encoding is performed on the first image 115 via AV1 codec, the AI up-scaler 234 may use A DNN setting information among the plurality of pieces of DNN setting information.

Also, when it is verified, from the information related to the first image 115, that the resolution of the first image 115 is HD, the bitrate of the image data obtained as the result of performing the first encoding is 15 Mbps, and the first encoding is performed via H.264 codec, the AI up-scaler 234 may use B DNN setting information among the plurality of pieces of DNN setting information.

Also, when it is verified, from the information related to the first image 115, that the resolution of the first image 115 is full HD, the bitrate of the image data obtained as the result of performing the first encoding is 20 Mbps, and the first encoding is performed via HEVC codec, the AI up-scaler 234 may use C DNN setting information among the plurality of pieces of DNN setting information, and when it is verified that the resolution of the first image 115 is full HD, the bitrate of the image data obtained as the result of performing the first encoding is 15 Mbps, and the first encoding is performed via HEVC codec, the AI up-scaler 234 may use D DNN setting information among the plurality of pieces of DNN setting information. One of the C DNN setting information and the D DNN setting information is selected based on whether the bitrate of the image data obtained as the result of performing the first encoding on the first image 115 is 20 Mbps or 15 Mbps. The different bitrates of the image data, obtained when the first encoding is performed on the first image 115 of the same resolution via the same codec, indicates different qualities of reconstructed images. Accordingly, a first DNN and a second DNN may be jointly trained based on an image quality, and accordingly, the AI up-scaler 234 may obtain DNN setting information according to a bitrate of image data indicating the quality of the second image 135.

According to embodiments, the AI up-scaler 234 may obtain the DNN setting information for performing AI up-scaling on the second image 135 from among the plurality of pieces of DNN setting information considering both information (prediction mode information, motion information, quantization parameter information, and the like) provided from the first decoder 232 and the information related to the first image 115 included in the AI data. For example, the AI up-scaler 234 may receive quantization parameter information used during a first encoding process of the first image 115 from the first decoder 232, verify a bitrate of image data obtained as an encoding result of the first image 115 from AI data, and obtain DNN setting information corresponding to the quantization parameter information and the bitrate. Even when the bitrates are the same, the quality of reconstructed images may vary according to the complexity of an image. A bitrate is a value representing the entire first image 115 on which first encoding is performed, and the quality of each frame may vary even within the first image 115. Accordingly, DNN setting information more suitable for the second image 135 may be obtained when prediction mode information, motion information, and/or a quantization parameter obtainable for each frame from the first decoder 232 are/is considered together, compared to when only the AI data is used.

Also, according to embodiments, the AI data may include an identifier of mutually agreed DNN setting information. An identifier of DNN setting information is information for distinguishing a pair of pieces of DNN setting information jointly trained between the first DNN and the second DNN, such that AI up-scaling is performed on the second image 135 to the up-scaling target corresponding to the down-scaling target of the first DNN. The AI up-scaler 234 may perform AI up-scaling on the second image 135 by using the DNN setting information corresponding to the identifier of the DNN setting information, after obtaining the identifier of the DNN setting information included in the AI data. For example, identifiers indicating each of the plurality of DNN setting information settable in the first DNN and identifiers indicating each of the plurality of DNN setting information settable in the second DNN may be previously designated. In this case, the same identifier may be designated for a pair of DNN setting information settable in each of the first DNN and the second DNN. The AI data may include an identifier of DNN setting information set in the first DNN for AI down-scaling of the original image 105. The AI up-scaler 234 that receives the AI data may perform AI up-scaling on the second image 135 by using the DNN setting information indicated by the identifier included in the AI data among the plurality of DNN setting information.

Also, according to embodiments, the AI data may include the DNN setting information. The AI up-scaler 234 may perform AI up-scaling on the second image 135 by using the DNN setting information after obtaining the DNN setting information included in the AI data.

According to embodiments, when pieces of information (for example, the number of convolution layers, the number of filter kernels for each convolution layer, a parameter of each filter kernel, and the like) constituting the DNN setting information are stored in a form of a lookup table, the AI up-scaler 234 may obtain the DNN setting information by combining some values selected from values in the lookup table, based on information included in the AI data, and perform AI up-scaling on the second image 135 by using the obtained DNN setting information.

According to embodiments, when a structure of DNN corresponding to the up-scaling target is determined, the AI up-scaler 234 may obtain the DNN setting information, for example, parameters of a filter kernel, corresponding to the determined structure of DNN.

The AI up-scaler 234 obtains the DNN setting information of the second DNN through the AI data including information related to the first DNN, and performs AI up-scaling on the second image 135 through the second DNN set based on the obtained DNN setting information, and in this case, memory usage and throughput may be reduced compared to when features of the second image 135 are directly analyzed for up-scaling.

According to embodiments, when the second image 135 includes a plurality of frames, the AI up-scaler 234 may independently obtain DNN setting information for a number of frames, or may obtain common DNN setting information for entire frames.

FIG. 6 is a diagram showing the second image 135 including a plurality of frames.

As shown in FIG. 6, the second image 135 may include frames t0 through tn.

According to embodiments, the AI up-scaler 234 may obtain DNN setting information of a second DNN through AI data, and perform AI up-scaling on the frames t0 through tn based on the obtained DNN setting information. In other words, the frames t0 through tn may be processed via AI up-scaling based on common DNN setting information.

According to embodiments, the AI up-scaler 234 may perform AI up-scaling on some of the frames t0 through tn, for example, the frames t0 through ta, by using 'A' DNN setting information obtained from AI data, and perform AI up-scaling on the frames ta+1 through tb by using 'B' DNN setting information obtained from the AI data. Also, the AI up-scaler 234 may perform AI up-scaling on the frames tb+1 through tn by using 'C' DNN setting information obtained from the AI data. In other words, the AI up-scaler 234 may independently obtain DNN setting information for each group including a number of frames among the plurality of frames, and perform AI up-scaling on frames included in each group by using the independently obtained DNN setting information.

According to embodiments, the AI up-scaler 234 may independently obtain DNN setting information for each frame forming the second image 135. In other words, when the second image 135 includes three frames, the AI up-scaler 234 may perform AI up-scaling on a first frame by using DNN setting information obtained in relation to the first frame, perform AI up-scaling on a second frame by using DNN setting information obtained in relation to the second frame, and perform AI up-scaling on a third frame by using DNN setting information obtained in relation to the third frame. DNN setting information may be independently obtained for each frame included in the second image 135, according to a method of obtaining DNN setting information based on information (prediction mode information, motion information, quantization parameter information, or the like) provided from the first decoder 232 and information related to the first image 115 included in the AI data described above. This is because the mode information, the quantization parameter information, or the like may be determined independently for each frame included in the second image 135.

According to embodiments, the AI data may include information about to which frame DNN setting information obtained based on the AI data is valid. For example, when the AI data includes information indicating that DNN setting information is valid up to the frame ta, the AI up-scaler 234 performs AI up-scaling on the frames t0 through ta by using DNN setting information obtained based on the AI data. Also, when another piece of AI data includes information indicating that DNN setting information is valid up to the frame tn, the AI up-scaler 234 performs AI up-scaling on the frames ta+1 through tn by using DNN setting information obtained based on the other piece of AI data.

Hereinafter, the AI encoding apparatus 600 for performing AI encoding on the original image 105 will be described with reference to FIG. 7.

Figure 7:
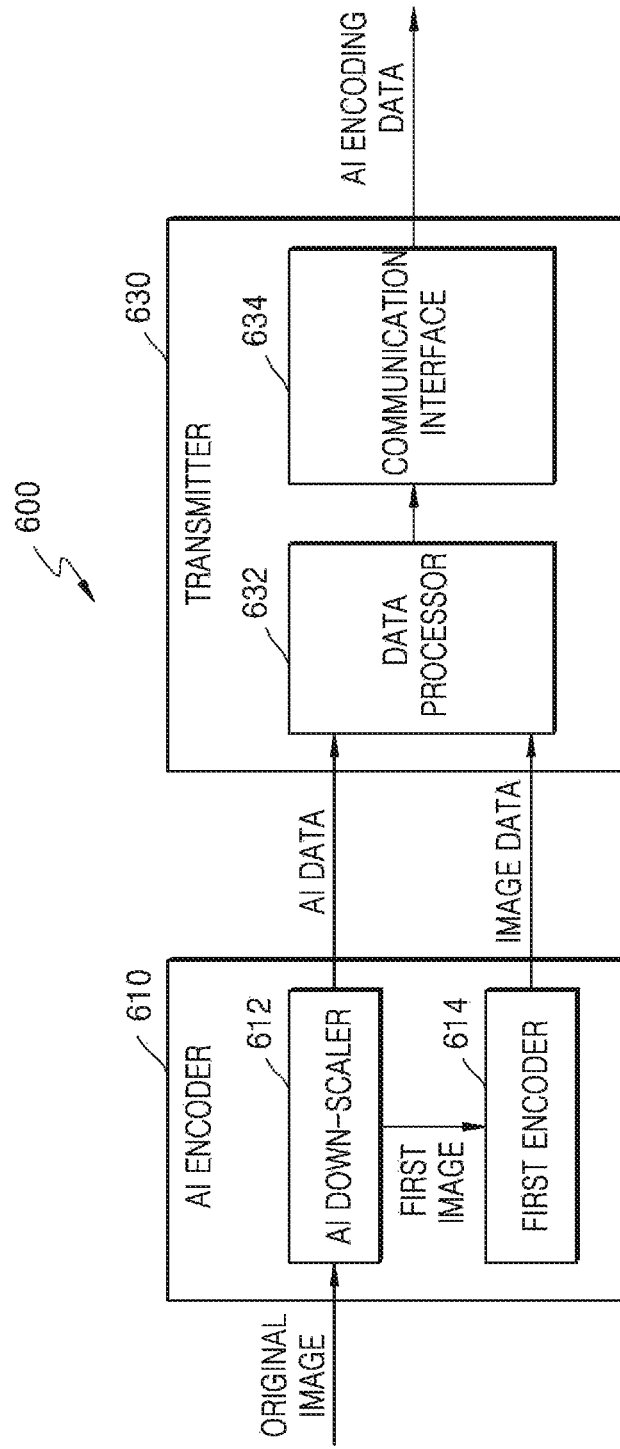
FIG. 7 is a block diagram of a configuration of an AI encoding apparatus according to embodiments.

FIG. 7 is a block diagram of a configuration of the AI encoding apparatus 600 according to embodiments.

Referring to FIG. 7, the AI encoding apparatus 600 may include an AI encoder 610 and a transmitter 630. The AI encoder 610 may include an AI down-scaler 612 and a first encoder 614. The transmitter 630 may include a data processor 632 and a communication interface 634.

In FIG. 7, the AI encoder 610 and the transmitter 630 are illustrated as separate devices, but the AI encoder 610 and the transmitter 630 may be implemented through one processor. In this case, the AI encoder 610 and the transmitter 630 may be implemented through an dedicated processor or through a combination of software and general-purpose processor such as AP, CPU or graphics processing unit GPU. The dedicated processor may be implemented by including a memory for implementing embodiments of the disclosure or by including a memory processor for using an external memory.

Also, the AI encoder 610 and the transmitter 630 may be configured by a plurality of processors. In this case, the AI encoder 610 and the transmitter 630 may be implemented through a combination of dedicated processors or through a combination of software and a plurality of general-purpose processors such as AP, CPU or GPU. The AI down-scaler 612 and the first encoder 614 may be implemented through different processors.

The AI encoder 610 performs AI down-scaling on the original image 105 and first encoding on the first image 115, and transmits AI data and image data to the transmitter 630. The transmitter 630 transmits the AI data and the image data to the AI decoding apparatus 200.

The image data includes data obtained as a result of performing the first encoding on the first image 115. The image data may include data obtained based on pixel values in the first image 115, for example, residual data that is a difference between the first image 115 and prediction data of the first image 115. Also, the image data includes information used during a first encoding process of the first image 115. For example, the image data may include prediction mode information, motion information, quantization parameter information used to perform the first encoding on the first image 115, and the like.

The AI data includes information enabling AI up-scaling to be performed on the second image 135 to an up-scaling target corresponding to a down-scaling target of a first DNN. According to embodiments, the AI data may include difference information between the original image 105 and the first image 115. Also, the AI data may include information related to the first image 115. The information related to the first image 115 may include information about any one or any combination of resolution of the first image 115, a bitrate of the image data obtained as the result of performing the first encoding on the first image 115, and a codec type used during the first encoding of the first image 115.

According to embodiments, the AI data may include an identifier of mutually agreed DNN setting information such that the AI up-scaling is performed on the second image 135 to the up-scaling target corresponding to the down-scaling target of the first DNN.

Also, according to embodiments, the AI data may include DNN setting information settable in a second DNN.

The AI down-scaler 612 may obtain the first image 115 obtained by performing the AI down-scaling on the original image 105 through the first DNN. The AI down-scaler 612 may determine the down-scaling target of the original image 105, based on a pre-determined standard.

To obtain the first image 115 matching the down-scaling target, the AI down-scaler 612 may store a plurality of pieces of DNN setting information settable in the first DNN. The AI down-scaler 612 obtains DNN setting information corresponding to the down-scaling target from among the plurality of pieces of DNN setting information, and performs the AI down-scaling on the original image 105 through the first DNN set in the obtained DNN setting information.

Each of the plurality of pieces of DNN setting information may be trained to obtain the first image 115 of pre-determined resolution and/or pre-determined quality. For example, any one piece of DNN setting information among the plurality of pieces of DNN setting information may include information for obtaining the first image 115 of resolution half resolution of the original image 105, for example, the first image 115 of 2 K (2048×1080) half 4 K (4096×2160) of the original image 105, and another piece of DNN setting information may include information for obtaining the first image 115 of resolution quarter resolution of the original image 105, for example, the first image 115 of 2 K (2048×1080) quarter 8 K (8192×4320) of the original image 105.

According to embodiments, when pieces of information (for example, the number of convolution layers, the number of filter kernels for each convolution layer, a parameter of each filter kernel, and the like) constituting the DNN setting information are stored in a form of a lookup table, the AI down-scaler 612 may obtain the DNN setting information by combining some values selected from values in the lookup table, based on the down-scaling target, and perform AI down-scaling on the original image 105 by using the obtained DNN setting information.

According to embodiments, the AI down-scaler 612 may determine a structure of DNN corresponding to the down-scaling target, and obtain DNN setting information corresponding to the determined structure of DNN, for example, obtain parameters of a filter kernel.

The plurality of pieces of DNN setting information for performing the AI down-scaling on the original image 105 may have an optimized value as the first DNN and the second DNN are jointly trained. Here, each piece of DNN setting information includes any one or any combination of the number of convolution layers included in the first DNN, the number of filter kernels for each convolution layer, and a parameter of each filter kernel.

The AI down-scaler 612 may set the first DNN with the DNN setting information obtained for performing the AI down-scaling on the original image 105 to obtain the first image 115 of a resolution and/or a quality through the first DNN. When the DNN setting information for performing the AI down-scaling on the original image 105 is obtained from the plurality of pieces of DNN setting information, each layer in the first DNN may process input data based on information included in the DNN setting information.

Hereinafter, a method, performed by the AI down-scaler 612, of determining the down-scaling target will be described. The down-scaling target may indicate, for example, by how much is resolution decreased from the original image 105 to obtain the first image 115.

According to embodiments, the AI down-scaler 612 may determine the down-scaling target based on any one or any combination of a compression ratio (for example, a resolution difference between the original image 105 and the first image 115, target bitrate, or the like), compression quality (for example, type of bitrate), compression history information, and a type of the original image 105.

For example, the AI down-scaler 612 may determine the down-scaling target based on the compression ratio, the compression quality, or the like, which is pre-set or input from a user.

As another example, the AI down-scaler 612 may determine the down-scaling target by using the compression history information stored in the AI encoding apparatus 600. For example, according to the compression history information usable by the AI encoding apparatus 600, encoding quality, a compression ratio, or the like preferred by the user may be determined, and the down-scaling target may be determined according to the encoding quality determined based on the compression history information. For example, the resolution, quality, or the like of the first image 115 may be determined according to the encoding quality that has been used most often according to the compression history information.

As another example, the AI down-scaler 612 may determine the down-scaling target based on the encoding quality that has been used more frequently than a threshold value (for example, average quality of the encoding quality that has been used more frequently than the threshold value), according to the compression history information.

As another example, the AI down-scaler 612 may determine the down-scaling target, based on the resolution, type (for example, a file format), or the like of the original image 105.

According to embodiments, when the original image 105 includes a plurality of frames, the AI down-scaler 612 may independently determine down-scaling target for a number of frames, or may determine down-scaling target for entire frames.

According to embodiments, the AI down-scaler 612 may divide the frames included in the original image 105 into a number of groups, and independently determine the down-scaling target for each group. The same or different down-scaling targets may be determined for each group. The number of frames included in the groups may be the same or different according to the each group.

According to embodiments, the AI down-scaler 612 may independently determine a down-scaling target for each frame included in the original image 105. The same or different down-scaling targets may be determined for each frame.

Hereinafter, an example of a structure of a first DNN 700 on which AI down-scaling is based will be described.

Figure 8:
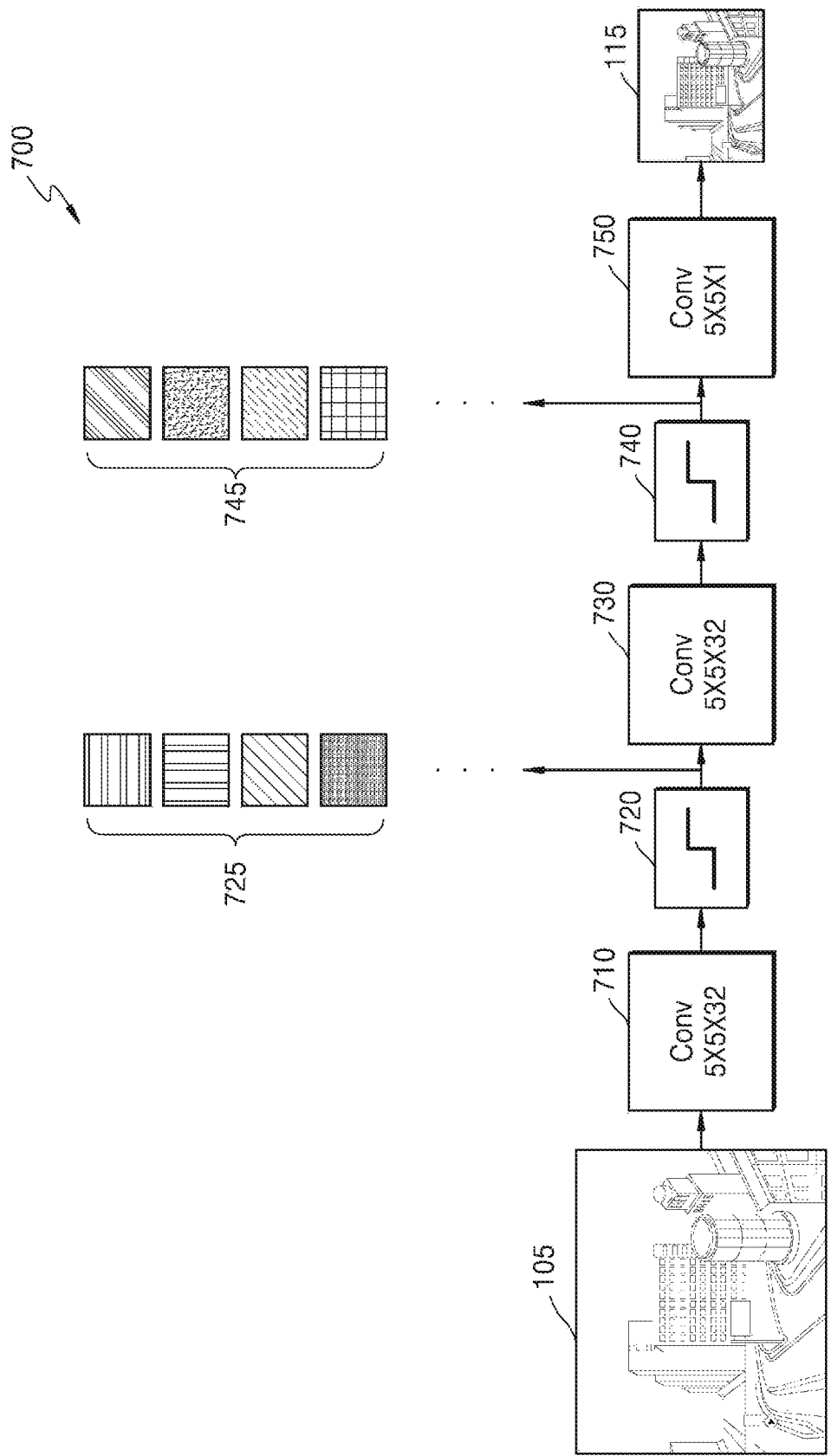
FIG. 8 is a diagram showing a first DNN for performing AI down-scaling on an original image.

FIG. 8 is a diagram showing the first DNN 700 for performing AI down-scaling on the original image 105.

As shown in FIG. 8, the original image 105 is input to a first convolution layer 710. The first convolution layer 710 performs a convolution process on the original image 105 by using 32 filter kernels having a size of 5×5. 32 feature maps generated as a result of the convolution process are input to a first activation layer 720. The first activation layer 720 may assign a non-linear feature to the 32 feature maps.

The first activation layer 720 determines whether to transmit sample values of the feature maps output from the first convolution layer 710 to a second convolution layer 730. For example, some of the sample values of the feature maps are activated by the first activation layer 720 and transmitted to the second convolution layer 730, and some of the sample values are deactivated by the first activation layer 720 and not transmitted to the second convolution layer 730. Information represented by the feature maps output from the first convolution layer 710 is emphasized by the first activation layer 720.

An output 725 of the first activation layer 720 is input to a second convolution layer 730. The second convolution layer 730 performs a convolution process on input data by using 32 filter kernels having a size of 5×5. 32 feature maps output as a result of the convolution process are input to a second activation layer 740, and the second activation layer 740 may assign a non-linear feature to the 32 feature maps.

An output 745 of the second activation layer 740 is input to a third convolution layer 750. The third convolution layer 750 performs a convolution process on input data by using one filter kernel having a size of 5×5. As a result of the convolution process, one image may be output from the third convolution layer 750. The third convolution layer 750 generates one output by using the one filter kernel as a layer for outputting a final image. According to embodiments of the disclosure, the third convolution layer 750 may output the first image 115 as a result of a convolution operation.

There may be a plurality of pieces of DNN setting information indicating the numbers of filter kernels of the first, second, and third convolution layers 710, 730, and 750 of the first DNN 700, a parameter of each filter kernel of the first, second, and third convolution layers 710, 730, and 750 of the first DNN 700, and the like, and the plurality of pieces of DNN setting information may be connected to a plurality of pieces of DNN setting information of a second DNN. The connection between the plurality of pieces of DNN setting information of the first DNN and the plurality of pieces of DNN setting information of the second DNN may be realized via joint training of the first DNN and the second DNN.

In FIG. 8, the first DNN 700 includes three convolution layers (the first, second, and third convolution layers 710, 730, and 750) and two activation layers (the first and second activation layers 720 and 740), but this is only an example, and the numbers of convolution layers and activation layers may vary according to embodiments. Also, according to embodiments, the first DNN 700 may be implemented as an RNN. In this case, a CNN structure of the first DNN 700 according to embodiments of the disclosure is changed to an RNN structure.

According to embodiments, the AI down-scaler 612 may include at least one ALU for the convolution operation and the operation of the activation layer described above. The ALU may be implemented as a processor. For the convolution operation, the ALU may include a multiplier that performs multiplication between sample values of the original image 105 or the feature map output from previous layer and sample values of the filter kernel, and an adder that adds result values of the multiplication. Also, for the operation of the activation layer, the ALU may include a multiplier that multiplies an input sample value by a weight used in a pre-determined sigmoid function, a Tanh function, or an ReLU function, and a comparator that compares a multiplication result and a value to determine whether to transmit the input sample value to a next layer.

Referring back to FIG. 7, upon receiving the first image 115 from the AI down-scaler 612, the first encoder 614 may reduce an information amount of the first image 115 by performing first encoding on the first image 115. The image data corresponding to the first image 115 may be obtained as a result of performing the first encoding by the first encoder 614.

The data processor 632 processes either one or both of the AI data and the image data to be transmitted in a form. For example, when the AI data and the image data are to be transmitted in a form of a bitstream, the data processor 632 may process the AI data to be expressed in a form of a bitstream, and transmit the image data and the AI data in a form of one bitstream through the communication interface 634. As another example, the data processor 632 may process the AI data to be expressed in a form of bitstream, and transmit each of a bitstream corresponding to the AI data and a bitstream corresponding to the image data through the communication interface 634. As another example, the data processor 632 may process the AI data to be expressed in a form of a frame or packet, and transmit the image data in a form of a bitstream and the AI data in a form of a frame or packet through the communication interface 634.

The communication interface 634 transmits AI encoding data obtained as a result of performing AI encoding, through a network. The AI encoding data obtained as the result of performing AI encoding includes the image data and the AI data. The image data and the AI data may be transmitted through a same type of network or different types of networks.

According to embodiments, the AI encoding data obtained as a result of processes of the data processor 632 may be stored in a data storage medium including a magnetic medium such as a hard disk, a floppy disk, or a magnetic tape, an optical recording medium such as CD-ROM or DVD, or a magneto-optical medium such as a floptical disk.

Hereinafter, a method of jointly training the first DNN 700 and the second DNN 300 will be described with reference to FIG. 9.

Figure 9:
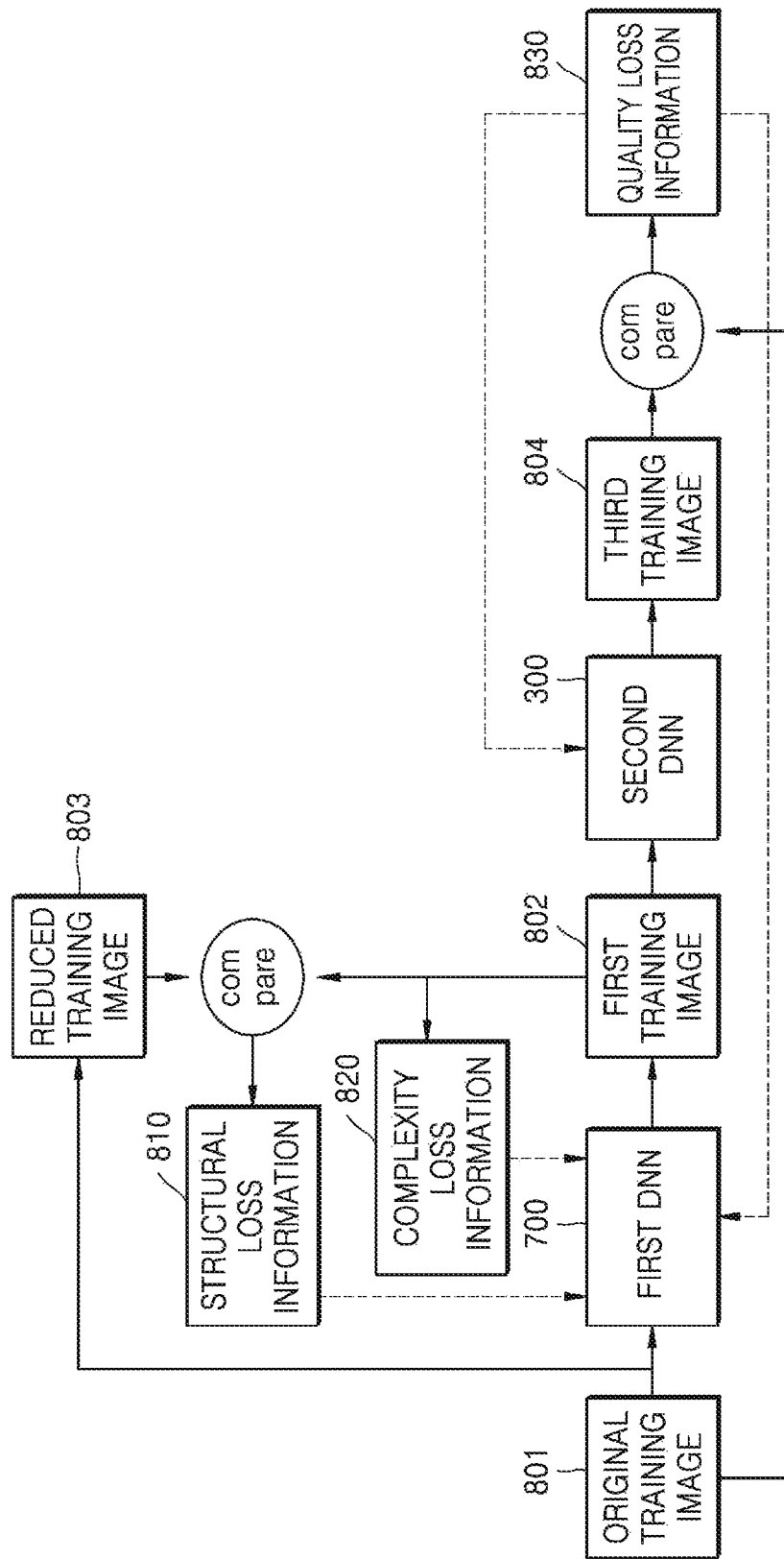
FIG. 9 is a diagram for describing a method of training a first DNN and a second DNN.

FIG. 9 is a diagram for describing a method of training the first DNN 700 and the second DNN 300.

In embodiments, the original image 105 on which AI encoding is performed through an AI encoding process is reconstructed to the third image 145 via an AI decoding process, and to maintain similarity between the original image 105 and the third image 145 obtained as a result of AI decoding, connectivity is between the AI encoding process and the AI decoding process is required. In other words, information lost in the AI encoding process needs to be reconstructed during the AI decoding process, and in this regard, the first DNN 700 and the second DNN 300 need to be jointly trained.

For accurate AI decoding, ultimately, quality loss information 830 corresponding to a result of comparing a third training image 804 and an original training image 801 shown in FIG. 9 needs to be reduced. Accordingly, the quality loss information 830 is used to train both of the first DNN 700 and the second DNN 300.

First, a training process shown in FIG. 9 will be described.

In FIG. 9, the original training image 801 is an image on which AI down-scaling is to be performed and a first training image 802 is an image obtained by performing AI down-scaling on the original training image 801. Also, the third training image 804 is an image obtained by performing AI up-scaling on the first training image 802.

The original training image 801 includes a still image or a moving image including a plurality of frames. According to embodiments, the original training image 801 may include a luminance image extracted from the still image or the moving image including the plurality of frames. Also, according to embodiments, the original training image 801 may include a patch image extracted from the still image or the moving image including the plurality of frames. When the original training image 801 includes the plurality of frames, the first training image 802, the second training image, and the third training image 804 also each include a plurality of frames. When the plurality of frames of the original training image 801 are sequentially input to the first DNN 700, the plurality of frames of the first training image 802, the second training image and the third training image 804 may be sequentially obtained through the first DNN 700 and the second DNN 300.

For joint training of the first DNN 700 and the second DNN 300, the original training image 801 is input to the first DNN 700. The original training image 801 input to the first DNN 700 is output as the first training image 802 via the AI down-scaling, and the first training image 802 is input to the second DNN 300. The third training image 804 is output as a result of performing the AI up-scaling on the first training image 802.

Referring to FIG. 9, the first training image 802 is input to the second DNN 300, and according to embodiments, a second training image obtained as first encoding and first decoding are performed on the first training image 802 may be input to the second DNN 300. To input the second training image to the second DNN 300, any one codec among MPEG-2, H.264, MPEG-4, HEVC, VC-1, VP8, VP9, and AV1 may be used. Any one codec among MPEG-2, H.264, MPEG-4, HEVC, VC-1, VP8, VP9, and AV1 may be used to perform first encoding on the first training image 802 and first decoding on image data corresponding to the first training image 802.

Referring to FIG. 9, separate from the first training image 802 being output through the first DNN 700, a reduced training image 803 obtained by performing legacy down-scaling on the original training image 801 is obtained. Here, the legacy down-scaling may include any one or any combination of bilinear scaling, bicubic scaling, lanczos scaling, and stair step scaling.

To prevent a structural feature of the first image 115 from deviating greatly from a structural feature of the original image 105, the reduced training image 803 is obtained to preserve the structural feature of the original training image 801.

Before training is performed, the first DNN 700 and the second DNN 300 may be set to pre-determined DNN setting information. When the training is performed, structural loss information 810, complexity loss information 820, and the quality loss information 830 may be determined.

The structural loss information 810 may be determined based on a result of comparing the reduced training image 803 and the first training image 802. For example, the structural loss information 810 may correspond to a difference between structural information of the reduced training image 803 and structural information of the first training image 802. Structural information may include various features extractable from an image, such as luminance, contrast, histogram, or the like of the image. The structural loss information 810 indicates how much structural information of the original training image 801 is maintained in the first training image 802. When the structural loss information 810 is small, the structural information of the first training image 802 is similar to the structural information of the original training image 801.

The complexity loss information 820 may be determined based on spatial complexity of the first training image 802. For example, a total variance value of the first training image 802 may be used as the spatial complexity. The complexity loss information 820 is related to a bitrate of image data obtained by performing first encoding on the first training image 802. It is defined that the bitrate of the image data is low when the complexity loss information 820 is small.

The quality loss information 830 may be determined based on a result of comparing the original training image 801 and the third training image 804. The quality loss information 830 may include any one or any combination of an L1-norm value, an L2-norm value, an Structural Similarity (SSIM) value, a Peak Signal-To-Noise Ratio-Human Vision System (PSNR-HVS) value, an Multiscale SSIM (MS-SSIM) value, a Variance Inflation Factor (VIF) value, and a Video Multimethod Assessment Fusion (VMAF) value regarding the difference between the original training image 801 and the third training image 804. The quality loss information 830 indicates how similar the third training image 804 is to the original training image 801. The third training image 804 is more similar to the original training image 802 when the quality loss information 830 is small.

Referring to FIG. 9, the structural loss information 810, the complexity loss information 820 and the quality loss information 830 are used to train the first DNN 700, and the quality loss information 830 is used to train the second DNN 300. In other words, the quality loss information 830 is used to train both the first and second DNNs 700 and 300.

The first DNN 700 may update a parameter such that final loss information determined based on the first through quality loss information 830 through 830 is reduced or minimized. Also, the second DNN 300 may update a parameter such that the quality loss information 830 is reduced or minimized.

The final loss information for training the first DNN 700 and the second DNN 300 may be determined as Equation 1 below.

$$\text{LossDS} = a \times \text{Structural loss information} + b \times \text{Complexity loss information} + c \times \text{Quality loss information}$$

$$\text{LossUS} = d \times \text{Quality loss information} \qquad \text{[Equation 1]}$$

In Equation 1, LossDS indicates final loss information to be reduced or minimized to train the first DNN 700, and LossUS indicates final loss information to be reduced or minimized to train the second DNN 300. Also, a, b, c and d may be pre-determined weights.

In other words, the first DNN 700 updates parameters in a direction LossDS of Equation 1 is reduced, and the second DNN 300 updates parameters in a direction LossUS is reduced. When the parameters of the first DNN 700 are updated according to LossDS derived during the training, the first training image 802 obtained based on the updated parameters becomes different from a previous first training image 802 obtained based on not updated parameters, and accordingly, the third training image 804 also becomes different from a previous third training image 804. When the third training image 804 becomes different from the previous third training image 804, the quality loss information 830 is also newly determined, and the second DNN 300 updates the parameters accordingly. When the quality loss information 830 is newly determined, LossDS is also newly determined, and the first DNN 700 updates the parameters according to newly determined LossDS. In other words, updating of the parameters of the first DNN 700 leads to updating of the parameters of the second DNN 300, and updating of the parameters of the second DNN 300 leads to updating of the parameters of the first DNN 700. In other words, because the first DNN 700 and the second DNN 300 are jointly trained by sharing the quality loss information 830, the parameters of the first DNN 700 and the parameters of the second DNN 300 may be jointly optimized.

Referring to Equation 1, it is verified that LossUS is determined according to the quality loss information 830, but this is only an example and LossUS may be determined based on either one or both of the structural loss information 810 and the complexity loss information 820, and the quality loss information 830.

Hereinabove, it has been described that the AI up-scaler 234 of the AI decoding apparatus 200 and the AI down-scaler 612 of the AI encoding apparatus 600 store the plurality of pieces of DNN setting information, and methods of training each of the plurality of pieces of DNN setting information stored in the AI up-scaler 234 and the AI down-scaler 612 will now be described.

As described with reference to Equation 1, the first DNN 700 updates the parameters considering the similarity (the structural loss information 810) between the structural information of the first training image 802 and the structural information of the original training image 801, the bitrate (the complexity loss information 820) of the image data obtained as a result of performing first encoding on the first training image 802, and the difference (the quality loss information 830) between the third training image 804 and the original training image 801.

The parameters of the first DNN 700 may be updated such that the first training image 802 having similar structural information as the original training image 801 is obtained and the image data having a small bitrate is obtained when first encoding is performed on the first training image 802, and at the same time, the second DNN 300 performing AI up-scaling on the first training image 802 obtains the third training image 804 similar to the original training image 801.

A direction in which the parameters of the first DNN 700 are optimized may vary by adjusting the weights a, b, and c of Equation 1. For example, when the weight b is determined to be high, the parameters of the first DNN 700 may be updated by prioritizing a low bitrate over high quality of the third training image 804. Also, when the weight c is determined to be high, the parameters of the first DNN 700 may be updated by prioritizing high quality of the third training image 804 over a high bitrate or maintaining of the structural information of the original training image 801.

Also, the direction in which the parameters of the first DNN 700 are optimized may vary according to a type of codec used to perform first encoding on the first training image 802. This is because the second training image to be input to the second DNN 300 may vary according to the type of codec.

In other words, the parameters of the first DNN 700 and the parameters of the second DNN 300 may be jointly updated based on the weights a, b, and c, and the type of codec for performing first encoding on the first training image 802. Accordingly, when the first DNN 700 and the second DNN 300 are trained after determining the weights a, b, and c each to a value and determining the type of codec to a type, the parameters of the first DNN 700 and the parameters of the second DNN 300 connected and optimized to each other may be determined.

Also, when the first DNN 700 and the second DNN 300 are trained after changing the weights a, b, and c, and the type of codec, the parameters of the first DNN 700 and the parameters of the second DNN 300 connected and optimized to each other may be determined. In other words, the plurality of pieces of DNN setting information jointly trained with each other may be determined in the first DNN 700 and the second DNN 300 when the first DNN 700 and the second DNN 300 are trained while changing values of the weights a, b, and c, and the type of codec.

As described above with reference to FIG. 5, the plurality of pieces of DNN setting information of the first DNN 700 and the second DNN 300 may be mapped to the information related to the first image. To set such a mapping relationship, first encoding may be performed on the first training image 802 output from the first DNN 700 via a codec according to a bitrate and the second training image obtained by performing first decoding on a bitstream obtained as a result of performing the first encoding may be input to the second DNN 300. In other words, by training the first DNN 700 and the second DNN 300 after setting an environment such that the first encoding is performed on the first training image 802 of a resolution via the codec according to the bitrate, a DNN setting information pair mapped to the resolution of the first training image 802, a type of the codec used to perform the first encoding on the first training image 802, and the bitrate of the bitstream obtained as a result of performing the first encoding on the first training image 802 may be determined. By variously changing the resolution of the first training image 802, the type of codec used to perform the first encoding on the first training image 802 and the bitrate of the bitstream obtained according to the first encoding of the first training image 802, the mapping relationships between the plurality of DNN setting information of the first DNN 700 and the second DNN 300 and the pieces of information related to the first image may be determined.

Figure 10:
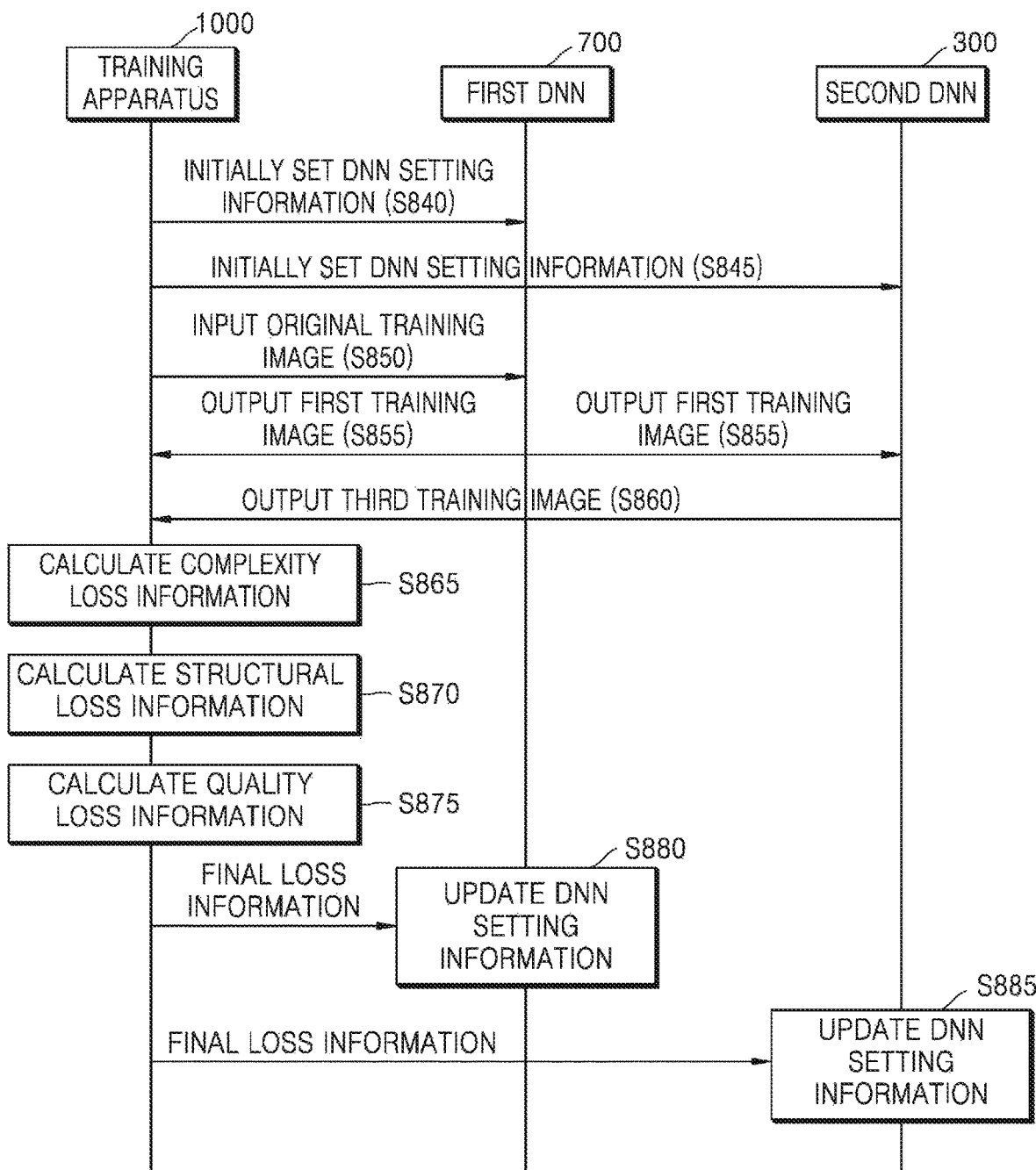
FIG. 10 is a diagram for describing a training process of a first DNN and a second DNN by a training apparatus.

FIG. 10 is a diagram for describing training processes of the first DNN 700 and the second DNN by a training apparatus 1000.

The training of the first DNN 700 and the second DNN 300 described with reference FIG. 9 may be performed by the training apparatus 1000. The training apparatus 1000 includes the first DNN 700 and the second DNN 300. The training apparatus 1000 may be, for example, the AI encoding apparatus 600 or a separate server. The DNN setting information of the second DNN 300 obtained as the training result is stored in the AI decoding apparatus 200.

Referring to FIG. 10, the training apparatus 1000 initially sets the DNN setting information of the first DNN 700 and the second DNN 300, in operations S840 and S845. Accordingly, the first DNN 700 and the second DNN 300 may operate according to pre-determined DNN setting information. The DNN setting information may include information about any one or any combination of the number of convolution layers included in the first DNN 700 and the second DNN 300, the number of filter kernels for each convolution layer, the size of a filter kernel for each convolution layer, and a parameter of each filter kernel.

The training apparatus 1000 inputs the original training image 801 into the first DNN 700, in operation S850. The original training image 801 may include a still image or at least one frame included in a moving image.

The first DNN 700 processes the original training image 801 according to the initially set DNN setting information and outputs the first training image 802 obtained by performing AI down-scaling on the original training image 801, in operation S855. In FIG. 10, the first training image 802 output from the first DNN 700 is directly input to the second DNN 300, but the first training image 802 output from the first DNN 700 may be input to the second DNN 300 by the training apparatus 1000. Also, the training apparatus 1000 may perform first encoding and first decoding on the first training image 802 via a codec, and then input the second training image to the second DNN 300.

The second DNN 300 processes the first training image 802 or the second training image according to the initially set DNN setting information and outputs the third training image 804 obtained by performing AI up-scaling on the first training image 802 or the second training image, in operation S860.

The training apparatus 1000 calculates the complexity loss information 820, based on the first training image 802, in operation S865.

The training apparatus 1000 calculates the structural loss information 810 by comparing the reduced training image 803 and the first training image 802, in operation S870.

The training apparatus 1000 calculates the quality loss information 830 by comparing the original training image 801 and the third training image 804, in operation S875.

The initially set DNN setting information is updated in operation S880 via a back propagation process based on the final loss information. The training apparatus 1000 may calculate the final loss information for training the first DNN 700, based on the complexity loss information 820, the structural loss information 810, and the quality loss information 830.

The second DNN 300 updates the initially set DNN setting information in operation S885 via a back propagation process based on the quality loss information 830 or the final loss information. The training apparatus 1000 may calculate the final loss information for training the second DNN 300, based on the quality loss information 830.

Then, the training apparatus 1000, the first DNN 700, and the second DNN 300 may repeat operations S850 through S885 until the final loss information is minimized to update the DNN setting information. At this time, during each repetition, the first DNN 700 and the second DNN 300 operate according to the DNN setting information updated in the previous operation.

Table 1 below shows effects when AI encoding and AI decoding are performed on the original image 105 according to embodiments of the disclosure and when encoding and decoding are performed on the original image 105 via HEVC.

As shown in Table 1, despite subjective image quality when AI encoding and AI decoding are performed on content including 300 frames of 8 K resolution, according to embodiments of the disclosure, is higher than subjective image quality when encoding and decoding are performed via HEVC, a bitrate is reduced by at least 50%.

Figure 11:
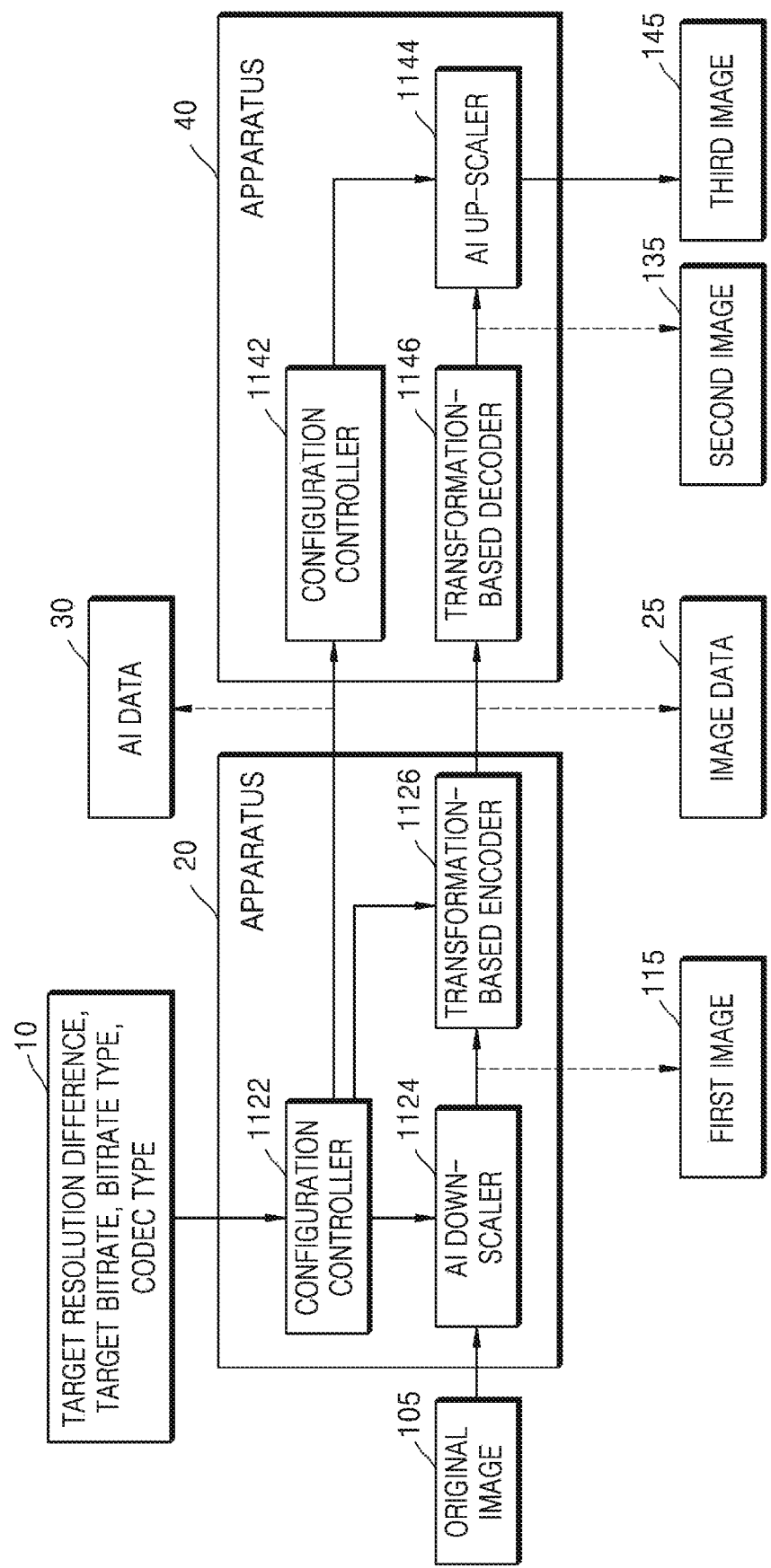
FIG. 11 is a diagram of an apparatus for performing AI down-scaling on an original image and an apparatus for performing AI up-scaling on a second image.

FIG. 11 is a diagram of an apparatus 20 for performing AI down-scaling on the original image 105 and an apparatus 40 for performing AI up-scaling on the second image 135.

The apparatus 20 receives the original image 105 and provides image data 25 and AI data 30 to the apparatus 40 by using an AI down-scaler 1124 and a transformation-based encoder 1126. According to embodiments, the image data 25 corresponds to the image data of FIG. 1 and the AI data 30 corresponds to the AI data of FIG. 1. Also, according to embodiments, the transformation-based encoder 1126 corresponds to the first encoder 614 of FIG. 7 and the AI down-scaler 1124 corresponds to the AI down-scaler 612 of FIG. 7.

The apparatus 40 receives the AI data 30 and the image data 25 and obtains the third image 145 by using a transformation-based decoder 1146 and an AI up-scaler 1144. According to embodiments, the transformation-based decoder 1146 corresponds to the first decoder 232 of FIG. 2 and the AI up-scaler 1144 corresponds to the AI up-scaler 234 of FIG. 2.

According to embodiments, the apparatus 20 includes a CPU, a memory, and a computer program including instructions. The computer program is stored in the memory. According to embodiments, the apparatus 20 performs functions to be described with reference to FIG. 11 according to execution of the computer program by the CPU. According to embodiments, the functions to be described with reference to FIG. 11 are performed by a dedicated hardware chip and/or the CPU.

According to embodiments, the apparatus 40 includes a CPU, a memory, and a computer program including instructions. The computer program is stored in the memory. According to embodiments, the apparatus 40 performs functions to be described with reference to FIG. 11 according to execution of the computer program by the CPU. According to embodiments, the functions to be described with reference to FIG. 11 are performed by a dedicated hardware chip and/or the CPU.

In FIG. 11, a configuration controller 1122 receives at least one input value 10. According to embodiments, the at least one input value 10 may include any one or any combination of a target resolution difference for the AI down-scaler 1124 and the AI up-scaler 1144, a bitrate of the image data 25, a bitrate type of the image data 25 (for

TABLE 1

| Content | Resolution | Frame Number | Information Amount (Bitrate) (Mbps) | | Subjective Image Quality Score (VMAF) | |
|---|---|---|---|---|---|---|
| | | | HEVC | AI Encoding/ AI Decoding | HEVC | AI Encoding/ AI Decoding |
| Content_01 | 8K | 300 frames | 46.3 | 21.4 | 94.80 | 93.54 |
| Content_02 | (7680 × 4320) | | 46.3 | 21.6 | 98.05 | 98.98 |
| Content_03 | | | 46.3 | 22.7 | 96.08 | 96.00 |
| Content_04 | | | 46.1 | 22.1 | 86.26 | 92.00 |
| Content_05 | | | 45.4 | 22.7 | 93.42 | 92.98 |
| Content_06 | | | 46.3 | 23.0 | 95.99 | 95.61 |
| | | Average | 46.11 | 22.25 | 94.10 | 94.85 | example, a variable bitrate type, a constant bitrate type, or an average bitrate type), and a codec type for the transformation-based encoder 1126. The at least one input value 10 may include a value pre-stored in the apparatus 20 or a value input from a user.

The configuration controller 1122 controls operations of the AI down-scaler 1124 and the transformation-based encoder 1126, based on the received input value 10. According to embodiments, the configuration controller 1122 obtains DNN setting information for the AI down-scaler 1124 according to the received input value 10, and sets the AI down-scaler 1124 with the obtained DNN setting information. According to embodiments, the configuration controller 1122 may transmit the received input value 10 to the AI down-scaler 1124 and the AI down-scaler 1124 may obtain the DNN setting information for performing AI down-scaling on the original image 105, based on the received input value 10. According to embodiments, the configuration controller 1122 may provide, to the AI down-scaler 1124, additional information, for example, color format (luminance component, chrominance component, red component, green component, or blue component) information to which AI down-scaling is applied and tone mapping information of a high dynamic range (HDR), together with the input value 10, and the AI down-scaler 1124 may obtain the DNN setting information considering the input value 10 and the additional information. According to embodiments, the configuration controller 1122 transmits at least a part of the received input value 10 to the transformation-based encoder 1126 and the transformation-based encoder 1126 performs first encoding on the first image 115 via a bitrate of a value, a bitrate of a type, and a codec.

The AI down-scaler 1124 receives the original image 105 and performs an operation described with reference to any one or any combination of FIGS. 1, 7, 8, 9, and 10 to obtain the first image 115.

According to embodiments, the AI data 30 is provided to the apparatus 40. The AI data 30 may include either one or both of resolution difference information between the original image 105 and the first image 115, and information related to the first image 115. The resolution difference information may be determined based on the target resolution difference of the input value 10, and the information related to the first image 115 may be determined based on any one or any combination of a target bitrate, the bitrate type, and the codec type. According to embodiments, the AI data 30 may include parameters used during the AI up-scaling. The AI data 30 may be provided from the AI down-scaler 1124 to the apparatus 40.

The image data 25 is obtained as the original image 105 is processed by the transformation-based encoder 1126, and is transmitted to the apparatus 40. The transformation-based encoder 1126 may process the first image 115 according to MPEG-2, H.264 AVC, MPEG-4, HEVC, VC-1, VP8, VP9, or VA1.

A configuration controller 1142 controls an operation of the AI up-scaler 1144, based on the AI data 30. According to embodiments, the configuration controller 1142 obtains the DNN setting information for the AI up-scaler 1144 according to the received AI data 30, and sets the AI up-scaler 1144 with the obtained DNN setting information. According to embodiments, the configuration controller 1142 may transmit the received AI data 30 to the AI up-scaler 1144 and the AI up-scaler 1144 may obtain the DNN setting information for performing AI up-scaling on the second image 135, based on the AI data 30. According to embodiments, the configuration controller 1142 may provide, to the AI up-scaler 1144, additional information, for example, the color format (luminance component, chrominance component, red component, green component, or blue component) information to which AI up-scaling is applied, and the tone mapping information of HDR, together with the AI data 30, and the AI up-scaler 1144 may obtain the DNN setting information considering the AI data 30 and the additional information. According to embodiments, the AI up-scaler 1144 may receive the AI data 30 from the configuration controller 1142, receive any one or any combination of prediction mode information, motion information, and quantization parameter information from the transformation-based decoder 1146, and obtain the DNN setting information based on the AI data 30 and any one or any combination of the prediction mode information, the motion information, and the quantization parameter information.

The transformation-based decoder 1146 may process the image data 25 to reconstruct the second image 135. The transformation-based decoder 1146 may process the image data 25 according to MPEG-2, H.264 AVC, MPEG-4, HEVC, VC-1, VP8, VP9, or AV1.

The AI up-scaler 1144 may obtain the third image 145 by performing AI up-scaling on the second image 135 provided from the transformation-based decoder 1146, based on the set DNN setting information.

The AI down-scaler 1124 may include a first DNN and the AI up-scaler 1144 may include a second DNN, and according to embodiments, DNN setting information for the first DNN and second DNN are trained according to the training method described with reference to FIGS. 9 and 10.

Figure 12:
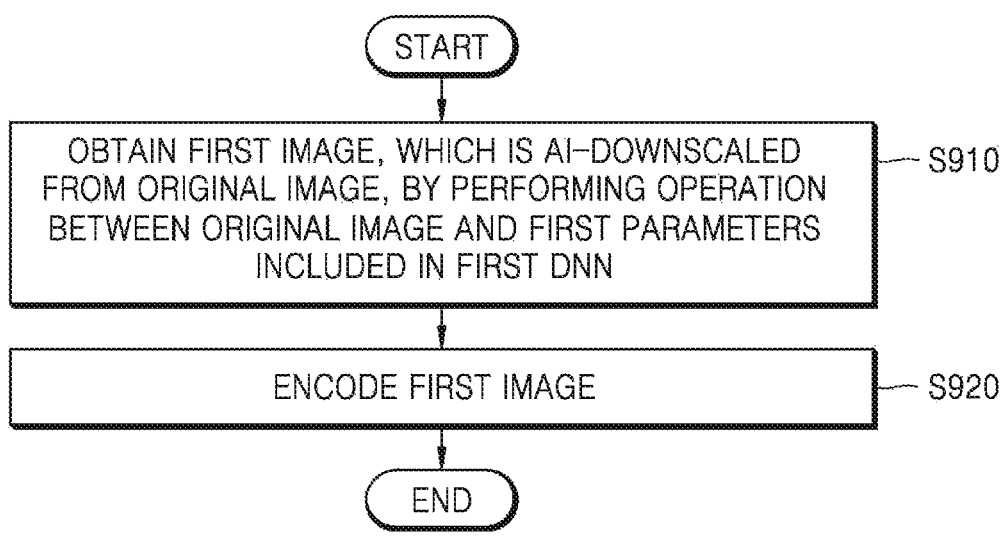
FIG. 12 is a flowchart illustrating an operating method of an AI encoding apparatus, according to embodiments of the disclosure.

FIG. 12 is a flowchart illustrating an operating method of an AI encoding apparatus, according to embodiments of the disclosure.

Referring to FIG. 12, the AI encoding apparatus 600 according to embodiments of the disclosure obtains a first image, which is AI-downscaled from an original image, by performing an operation between the original image and parameters (first parameters) of a filter kernel included in a first DNN (S910).

The first DNN according to embodiments of the disclosure is a network configured to AI-downscale an image and may be a network, which corresponds to a second DNN configured to AI-upscale an image and is trained in connection with the second DNN. As the first DNN and the second DNN are trained in connection with each other, the first parameters included in the first DNN are determined as values associated with parameters (second parameters) of a filter kernel included in the second DNN. For example, in the training of the first DNN and the second DNN, when the first parameters of the first DNN are updated, a first training image output from the first DNN is changed, when the first training image input to the second DNN is changed, a third training image output from the second DNN is also changed, and when the third training image is changed, loss information (for example, quality loss information) for the training of the second DNN is newly determined. Thus, the second parameters of the second DNN are updated toward minimizing the newly determined quality loss information. When the quality loss information is newly determined, final loss information for the training of the first DNN is also newly determined, and the first parameters of the first DNN are updated toward minimizing the newly determined final loss information for the training of the first DNN. Therefore, the first parameters of the first DNN complete with the training and the second parameters of the second DNN complete with the training have values associated with each other.

Each of the first parameters included in the first DNN according to embodiments of the disclosure is represented by a product of a scale factor a1 and one of k integer values, and each of the k integer values is 0 or ±$2^n$ (where n is an integer).

For example, when the first parameters included in the first DNN are represented by a parameter matrix W1, the parameter matrix W1 may be converted into a product of the scale factor a1 and a parameter matrix $W_{b1}$ including the k integer values. Here, the parameter matrix $W_{b1}$ may be a k-ary matrix including the k integer values. Thus, the operation (convolution operation) of the first image and the first parameters included in the first DNN may be represented by Equation 2.

$$I1*W1 \approx a1(I1*W_{b1})$$ [Equation 2]

In Equation 2, I1 denotes the original image, W1 denotes a parameter matrix including real numbers, $W_{b1}$ denotes a parameter matrix including the k integer values, and a1 denotes a scale factor and is a real number.

The parameter matrix $W_{b1}$ may be a matrix including only integer values, wherein each of the integer values may be 0 or ±$2^n$ (where n is an integer). For example, when k=2, the parameter matrix $W_{b1}$ may be a matrix including values of −1 or 1, when k=3, the parameter matrix $W_{b1}$ may be a matrix including values of any one or any combination of −1, 0, and 1, and when k=5, the parameter matrix $W_{b1}$ may be a matrix including values of any one or any combination of −2, −1, 0, 1, and 2. In addition, when k=7, the parameter matrix $W_{b1}$ may be a matrix including values of any one or any combination of −4, −2, −1, 0, 1, 2, and 4. However, the disclosure is not limited thereto.

As the first DNN and the second DNN, according to embodiments of the disclosure, are trained in connection with each other, the integer values included in the parameter matrix $W_{b1}$ of the first DNN may be determined as values associated with integer values included in a parameter matrix $W_{b2}$ of the second DNN.

When the parameter matrix $W_{b1}$ according to embodiments of the disclosure includes only integers, because a convolution operation (that is, $I1*W_{b1}$) between the original image and the parameter matrix $W_{b1}$ includes only multiplication operations of integers and addition operations of integers, the convolution operation of $I1*W_{b1}$ may reduce amounts of memory and calculation, as compared with a convolution operation of I1*W1 including multiplication operations of real numbers by integers and addition operations of real numbers.

In addition, when the parameter matrix $W_{b1}$ according to embodiments of the disclosure includes only 0 or ±$2^n$ (where n is an integer), because an operation of multiplying by 2 may be substituted with a shift operation, the convolution operation ($I1*W_{b1}$) between the original image and the parameter matrix $W_{b1}$ may exclusively include addition and shift operations of integers. Thus, the convolution operation of $I1*W_{b1}$ may reduce amounts of memory and calculation, as compared with the convolution operation of I1*W1.

The AI encoding apparatus 600 may perform the operation on the original image and the first parameters included in the first DNN by multiplying a result of the convolution operation between the original image and the parameter matrix $W_{b1}$ by the scale factor a1.

For example, the AI encoding apparatus 600 may obtain, but is not limited to, the first image by performing operations such as an activation function or the like, in addition to the operation between the original image and the first parameters included in the first DNN.

The AI encoding apparatus 600 may encode the obtained first image (S920).

Figure 13:
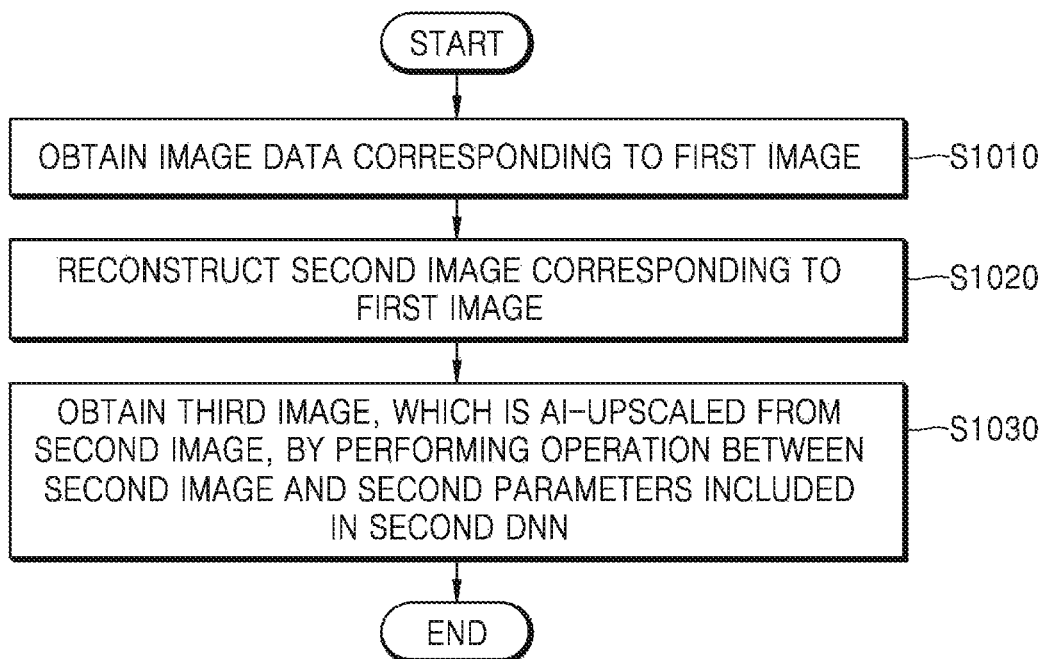
FIG. 13 is a flowchart illustrating an operating method of an AI decoding apparatus, according to embodiments of the disclosure.

FIG. 13 is a flowchart illustrating an operating method of an AI decoding apparatus, according to embodiments of the disclosure.

Referring to FIG. 13, the AI decoding apparatus 200 according to embodiments of the disclosure obtains image data corresponding to a first image (S1010).

Here, the first image may be an image that is AI-downscaled from an original image by using a first DNN, and the image data may be generated as a result of encoding the first image. The AI decoding apparatus 200 may receive the image data in a bitstream form.

The AI decoding apparatus 200 may reconstruct a second image corresponding to the first image, based on the image data (S1020).

The AI decoding apparatus 200 may receive the image data and AI data, may obtain residual data of the second image by using the image data, and may reconstruct the second image by using prediction data and the residual data.

The AI decoding apparatus 200 may input the reconstructed second image to the second DNN 300 and may obtain a third image, which is upscaled from the second image, by performing an operation between the second image input to the second DNN 300 and parameters (second parameters) of a filter kernel included in the second DNN (S1030). Here, the parameters of the filter kernel included in the second DNN are determined based on the AI data.

The second DNN according to embodiments of the disclosure is a network configured to AI-upscale an image and is also a network, which corresponds to the first DNN configured to AI-downscale an image and is trained in connection with the first DNN. As the second DNN and the first DNN are trained in connection with each other, the second parameters included in the second DNN are determined as values associated with parameters (first parameters) of a filter kernel included in the first DNN. For example, in the training of the first DNN and the second DNN, when the first parameters of the first DNN are updated, a first training image output from the first DNN is changed, when the first training image input to the second DNN is changed, a third training image output from the second DNN is also changed, and when the third training image is changed, loss information (for example, quality loss information) for the training of the second DNN is newly determined. Thus, the second parameters of the second DNN are updated toward minimizing the newly determined quality loss information. When the quality loss information is newly determined, final loss information for the training of the first DNN is also newly determined, and the first parameters of the first DNN are updated toward minimizing the newly determined final loss information for the training of the first DNN. Therefore, the first parameters of the first DNN complete with the training and the second parameters of the second DNN complete with the training have values associated with each other.

Each of the second parameters included in the second DNN 300 according to embodiments of the disclosure is represented by a product of a scale factor a2 and one of k integer values, and each of the k integer values is 0 or ±$2^n$ (where n is an integer).

For example, when the second parameters included in the second DNN are represented by a parameter matrix W2, the parameter matrix W2 may be converted into a product of the scale factor a2 and a parameter matrix $W_{b2}$ including the k integer values. Here, the parameter matrix $W_{b2}$ may be a k-ary matrix including the k integer values. Thus, the operation (convolution operation) of the second image and the second parameters included in the second DNN may be represented by Equation 3.

$$I2*W2 \approx a2(I2*W_{b2})$$ [Equation 3]

In Equation 3, I2 denotes the second image, W2 denotes a parameter matrix including real numbers, $W_{b2}$ denotes a parameter matrix including the k integer values, and a2 denotes a scale factor and is a real number.

The parameter matrix $W_{b2}$ may be a matrix including only integer values, wherein each of the integer values may be 0 or $\pm 2^n$ (where n is an integer). For example, when k=2, the parameter matrix $W_{b2}$ may be a matrix including values of −1 or 1, when k=3, the parameter matrix $W_{b2}$ may be a matrix including values of any one or any combination of −1, 0, and 1, and when k=5, the parameter matrix $W_{b2}$ may be a matrix including values of any one or any combination of −2, −1, 0, 1, and 2. In addition, when k=7, the parameter matrix $W_{b2}$ may be a matrix including values of any one or any combination of −4, −2, −1, 0, 1, 2, and 4. However, the disclosure is not limited thereto.

As the second DNN and the first DNN, according to embodiments of the disclosure, are trained in connection with each other, the integer values included in the parameter matrix $W_{b2}$ of the second DNN may be determined as values associated with integer values included in the parameter matrix $W_{b1}$ of the first DNN.

When the parameter matrix $W_{b2}$ according to embodiments of the disclosure includes only integers, because an operation (that is, $I2*W_{b2}$) of the second image and the parameter matrix $W_{b2}$ (a convolution operation between integers) exclusively includes multiplication operations of integers and addition operations of integers, the operation of $I2*W_{b2}$ may reduce amounts of memory and calculation, as compared with the operation of $I2*W2$ including multiplication operations of real numbers by integers and addition operations of real numbers.

In addition, when the parameter matrix $W_{b2}$ according to embodiments of the disclosure includes only 0 or $\pm 2^n$ (where n is an integer), because an operation of multiplying by 2 may be substituted with a shift calculation, the convolution operation ($I2*W_{b2}$) between the second image and the parameter matrix $W_{b2}$ may exclusively include addition and shift operations of integers. Thus, the convolution calculation of $I2*W_{b2}$ may reduce amounts of memory and calculation as compared with the convolution calculation of $I2*W2$.

The AI decoding apparatus 200 may perform the operation on the second image and the second parameters included in the second DNN by multiplying a result of the convolution operation ($I2*W_{b2}$) between the second image and the parameter matrix $W_{b2}$ by the scale factor a2.

For example, the AI decoding apparatus 200 may obtain, but is not limited to, the third image by performing operations such as an activation function or the like, in addition to the operation on the second image and the parameters included in the second DNN.

Figure 14:
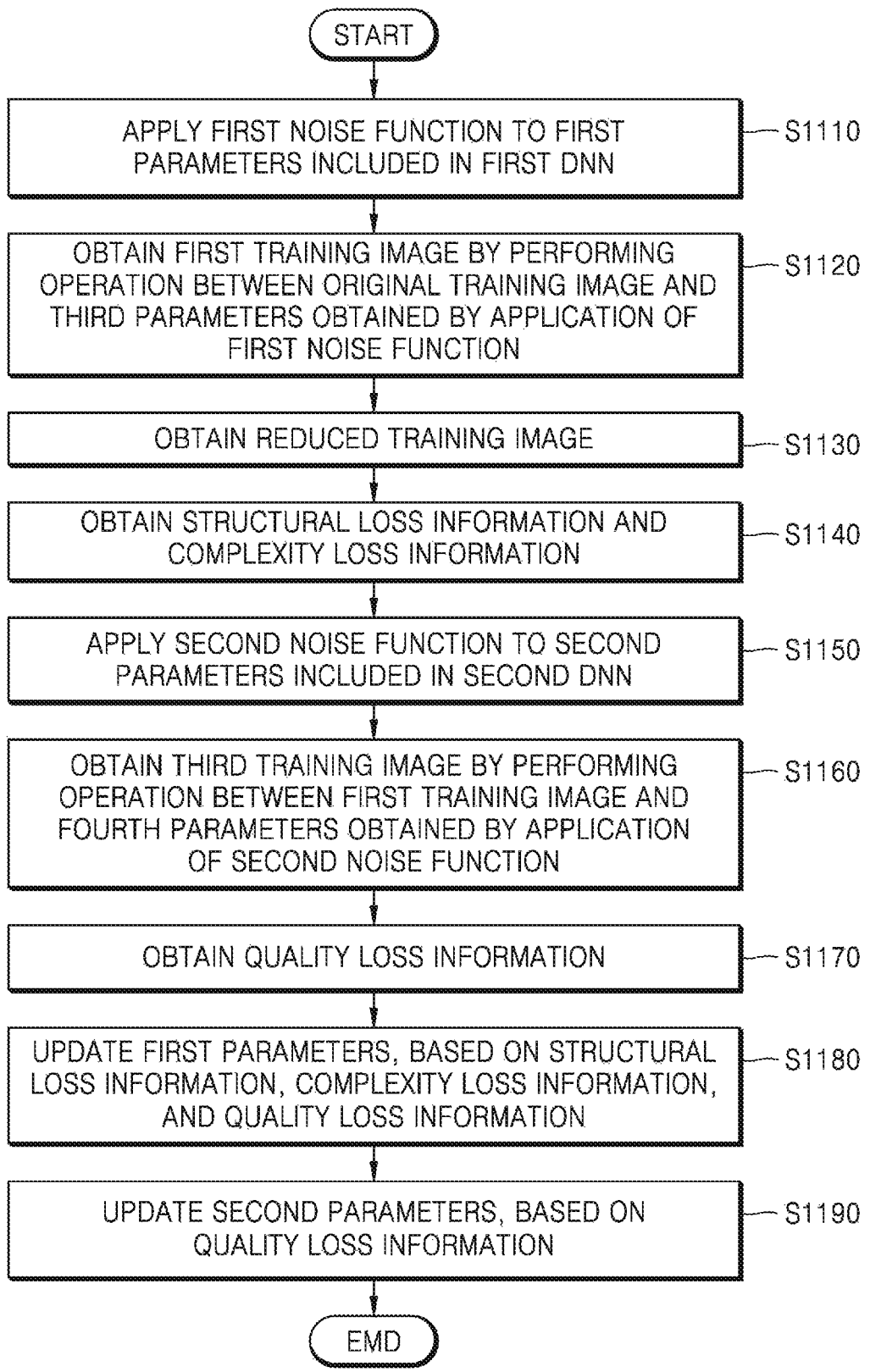
FIG. 14 is a flowchart illustrating a method of training a first DNN and a second DNN, according to embodiments of the disclosure.

FIG. 14 is a flowchart illustrating a method of training a first DNN and a second DNN, according to embodiments of the disclosure.

Referring to FIG. 14, an electronic device according to embodiments of the disclosure applies a first noise function to parameters (first parameters) included in a filter kernel of a first DNN, as shown in Equation 4 (S1110). The reason of applying a noise function will be described below.

$$W1'=W1+W1 \times n1$$ [Equation 4]

In Equation 4, W1 denotes the first parameters included in the first DNN, and n1 denotes the first noise function. The first noise function is a function with an average of 0 and may be a Gaussian function. In addition, a standard deviation of the first noise function may be determined as a small value, wherein the standard deviation does not exert a significant influence on values of the first parameters.

The electronic device obtains the first training image 802 by performing an operation on parameters (third parameters) W', which is obtained by the application of the first noise function, and the original training image 801 for the training of the first DNN (S1120).

The electronic device may convert the third parameters W', which is obtained by the application of the first noise function, into a product of a scale factor a3 and a parameter matrix $W_{b3}$ including k integer values. For example, an equation for calculating output data (first training image 802) of the first DNN may be represented by Equation 5.

$$y=F(W1,x)=F(W_{b3},a3,x)$$ [Equation 5]

In Equation 5, x denotes training data (original training image 801), and y denotes the output data (first training image 802) of the first DNN. In addition, the function F may be a function representing an operation for AI downscaling. The electronic device may perform a convolution operation between the original training image 801 and the parameter matrix $W_{b3}$ by performing multiplication operations and addition operations on the original training image 801 and the parameter matrix $W_{b3}$. Alternatively, when the parameter matrix $W_{b3}$ includes only 0 or $\pm 2^n$ (where n is an integer), the electronic device may perform the convolution operation between the original training image 801 and the parameter matrix $W_{b3}$ by performing shift operations and addition operations between the original training image 801 and the parameter matrix $W_{b3}$.

In addition, the electronic device may perform the operation for AI downscaling by multiplying a result of the convolution operation between the original training image 801 and the parameter matrix $W_{b3}$ by the scale factor a3.

Further, the electronic device may obtain the reduced training image 803, which is downscaled from the original training image 801 (S1130).

For example, separately from outputting the first training image 802 from the first DNN, the reduced training image 803, which is legacy-downscaled from the original training image 801, may be obtained. The reduced training image 803 preserving structural features of the original training image 801 may be obtained.

The electronic device may obtain the structural loss information 810 and the complexity loss information 820, based on the first training image 802 and the reduced training image 803 (S1140).

The structural loss information 810 may be determined based on a comparison result between the reduced training image 803 and the first training image 802. The complexity loss information 820 may be determined based on spatial complexity of the first training image 802. Because this has been described with reference to FIG. 9, descriptions thereof will be omitted.

The electronic device may apply a second noise function to second parameters W2 of a filter kernel included in the second DNN, as shown in Equation 6 (S1150).

$$W2'=W2+W2 \times n2$$ [Equation 6]

In Equation 6, W2 denotes the second parameters included in the second DNN, and n2 denotes the second noise function. The second noise function is a function with an average of 0 and may be a Gaussian function. In addition, a standard deviation of the second noise function may be determined as a small value, wherein the standard deviation does not exert a significant influence on values of the second parameters.

The electronic device may obtain the third training image 804 by performing an operation between fourth parameters W2', which are obtained by the application of the second noise function, and the first training image 802 (S1160).

Here, the first training image 802 may be an image obtained in operation S1120. Depending upon embodiments of the disclosure, the third training image 804 may be obtained by performing an operation on the fourth parameters and the second training image, which is generated by first encoding and first decoding of the first training image 802.

The electronic device may convert the fourth parameters W2', which are obtained by the application of the second noise function, into a product of a scale factor a4 and a parameter matrix $W_{b4}$ including k integer values. For example, an equation for calculating output data (third training image 804) of the second DNN may be represented by Equation 7.

$$y = F(W2, x) = F(W_{b4}, a4, x) \quad \text{[Equation 7]}$$

In Equation 7, x denotes training data (first training image 802), and y denotes the output data (third training image 804) of the second DNN. In addition, the function F may be a function representing an operation for AI upscaling. A convolution operation between the first training image 802 and the parameter matrix $W_{b4}$ may be performed by performing multiplication operations and addition operations on the first training image 802 and the parameter matrix $W_{b4}$. Alternatively, when the parameter matrix $W_{b4}$ includes only 0 or $\pm 2^n$ (where n is an integer), the convolution operation between the first training image 802 and the parameter matrix $W_{b4}$ may be performed by performing shift operations and addition operations between the first training image 802 and the parameter matrix $W_{b4}$.

In addition, the operation for AI upscaling may be performed by multiplying a result of the convolution operation between the first training image 802 and the parameter matrix $W_{b4}$ by the scale factor a4.

The electronic device may obtain the quality loss information 830, based on the third training image 804 and the original training image 801 (S1170).

The quality loss information 830 may be determined based on a comparison result between the original training image 801 and the third training image 804 and indicates how much similarity there is between the third training image 804 and the original training image 801. Because the quality loss information 830 has been described with reference to FIG. 9, descriptions thereof will be omitted.

The electronic device may update the first parameters, based on the structural loss information 810, the complexity loss information 820, and the quality loss information 830 (S1180). For example, the electronic device may update the first parameters toward reducing a difference between the output data (first training image 802) of the first DNN and label data. Here, the difference (loss information $LOSS_{DS}$ for the training of the first DNN) between the output data (first training image 802) and the label data may be determined based on the structural loss information, the complexity loss information, and the quality loss information.

The structural loss information, which is one of three pieces of loss information for the training of the first DNN, will be described as an example.

$$LOSS_{DS1}(W_{b3}, a3) = \Sigma_i \| F(W_{b3}, a3, X_i) - Y_i \|^2 \quad \text{[Equation 8]}$$

$$LOSS_{DS1}(W1, a3) = \Sigma_i \| F(f(W1'), a3, X_i) - Y_i \|^2 \quad \text{[Equation 9]}$$

In Equations 8 and 9, $LOSS_{DS1}$ denotes the structural loss information for the training of the first DNN, Xi denotes one pixel value of the original training image 801, and Yi denotes the label data (reduced training image 803) corresponding to Xi. In addition, f(W1') denotes a function converting the third parameters W1', which are obtained by the application of the first noise function, into the parameter matrix $W_{b3}$.

The values of the first parameters may be updated toward reducing errors, by using a gradient descent method.

Figure 15:
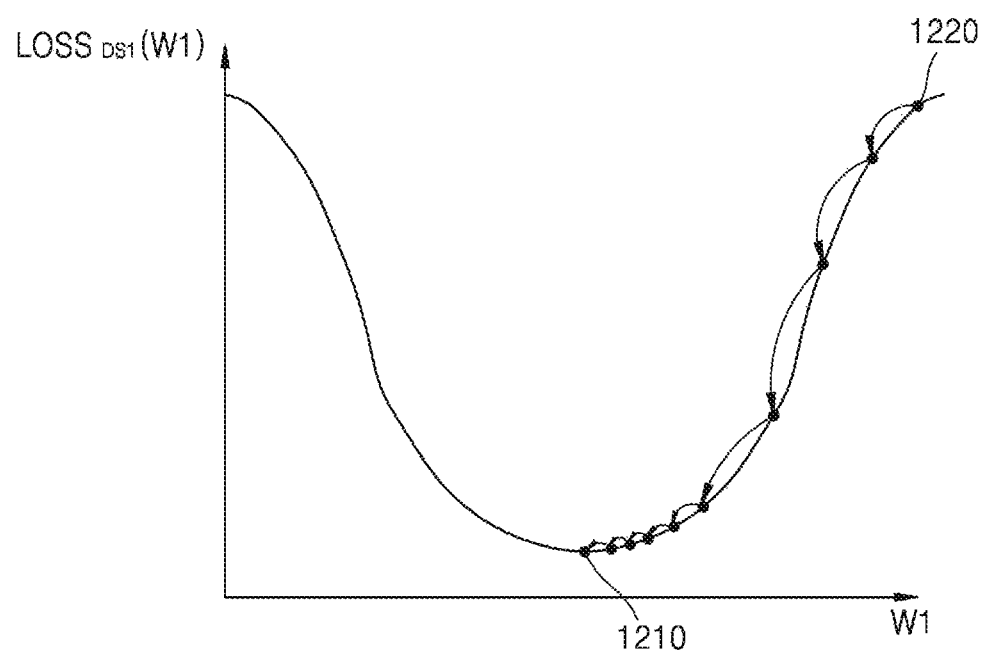
FIG. 15 is a referential diagram illustrating a method of updating values of first parameters by using a gradient descent method.

FIG. 15 is a referential diagram illustrating a method of updating the values of the first parameters by using the gradient descent method.

For example, referring to FIG. 15, the loss information $LOSS_{DS1}$ may be expressed as a quadratic function of the first parameter W1. Here, a first point 1210 is a point at which $LOSS_{DS1}$ has a minimum value, and the first parameter W1 may be updated until the first parameter W1 becomes a value corresponding to the first point 1210.

When a point corresponding to a current value of the first parameter W1 is assumed to be a second point 1220, $$\frac{\partial LOSS_{DS1}}{\partial W_1}$$

may be calculated by using the current value of the first parameter W1, and the value of the first parameter may be updated in the manner of multiplying a result of the calculation by a learning rate (a value of alpha) and then subtracting a result of the multiplication from the current value of the first parameter.

By using the gradient descent method, the first parameters of the first DNN may be updated until the values of the first parameters become values corresponding to the first point 1210.

To update the value of the first parameter, $$\frac{\partial LOSS_{DS1}}{\partial W_1}$$

needs to be calculated, as shown in Equation 10.

$$\frac{\partial}{\partial w1} LOSS_{DS1}(W1, a3) = \quad \text{[Equation 10]}$$

$$\frac{\partial}{\partial w1} \sum_i \| F(f(W1'), a3, X_i) - Y_i \|^2$$

When f(W1) is used instead of f(W1') in calculating Equation 7, because a slope of the conversion function f(W1) converting, into $W_{b3}$, the first parameters W1, to which the first noise function has not been applied, is 0, the conversion function f(W1) is not differentiable. However, although the conversion function f(W1) may be made differentiable by re-defining the slope of f(W1) as w1, because values of f(W1) include only k integer values despite re-defining the slope of f(W1), the slope of f(W1) is constant for each of k ranges. Thus, when the first parameters are updated by using the constant slope of f(W1), the updated first parameters infinitely increase or decrease and do not converge on one value. Here, when a clip function clip[a, b] is applied to the updated first parameters, the updated first parameters may be prevented from infinitely increasing or decreasing. However, because a slope of the clip function clip[a, b] is 0 in ranges out of a range [a, b], when the values of the first parameters become a or b, the values of the first parameters no longer vary and the first parameters are not updated.

Therefore, to prevent this, the first parameters according to embodiments of the disclosure are trained by using the third parameters W1' obtained by applying the first noise function to the first parameters.

In addition, the electronic device updates the second parameters, based on the quality loss information (S1190).

For example, the electronic device may update the second parameters toward reducing a difference between the output data (third training image 804) of the second DNN and label data (original training image 801). Here, the label data is the original training image 801, which has been input to the first DNN, and thus, the first DNN and the second DNN are trained in connection with each other.

The difference (loss information $LOSS_{US}$ for the training of the second DNN) between the output data (third training image 804) and the label data (original training image 801) may be determined based on the quality loss information and may be represented by Equation 11 or 12.

$$LOSS_{US}(W_{b4}, a4) = \Sigma_i \|F(W_{b4}, a4, X_i) - Y_i\|^2 \quad \text{[Equation 11]}$$

$$LOSS_{US}(W2, a4) = \Sigma_i \|F(f(W2'), a4, X_i) - Y_i\|^2 \quad \text{[Equation 12]}$$

In Equations 11 and 12, $LOSS_{US}$ denotes loss information for the training of the second DNN, Xi denotes one pixel value of the first training image 802, and Yi denotes label data (original training image) corresponding to Xi. In addition, f(W2') denotes a function converting the fourth parameters W2', which are obtained by the application of the second noise function, into the parameter matrix $W_{b4}$.

By using the gradient descent method, the values of the second parameters may be updated until the loss information $LOSS_{US}$ has a minimum value.

Here, the loss information $LOSS_{US}$ may be expressed as a quadratic function of the second parameter W2, and the value of the second parameter W2 may be updated in the manner of calculating by using a current value of the second parameter W2, $$\frac{\partial LOSS_{US}}{\partial W2}$$

multiplying a result of the calculation by a learning rate (a value of alpha), and then subtracting a result of the multiplication from the current value of the second parameter W2, until the value of the second parameter W2 becomes a minimum point of the quadratic function.

As described with reference to Equation 10, $$\frac{\partial LOSS_{US}}{\partial w2}$$

to calculate, slope re-definition may be performed and a clip function clip[a, b] may be applied to the updated second parameters, and here, because a slope of the clip function clip[a, b] is 0 in ranges out of the range [a, b], when the values of the second parameters become a or b, the values of the second parameters no longer vary and the second parameters are not updated. Therefore, to prevent this, the second parameters according to embodiments of the disclosure are trained by using the fourth parameters obtained by applying the second noise function to the second parameters.

When the values of the first parameters included in the first DNN are determined by completing the training of the first DNN and the second DNN, $\widetilde{W1}$ the final first parameters (for example, a first parameter matrix) may be converted into a product of a scale factor b1 and a first k-ary parameter matrix including k integer values.

In addition, the scale factor b1 and the first k-ary parameter matrix including the k integer values may be stored in memory. Here, when each of the k integer values included in the first k-ary parameter matrix is only 0 or $\pm 2^n$ (where n is an integer), a convolution operation performed in AI-downscaling an image by using the first DNN may be substituted with shift operations and addition operations.

Thus, the convolution operation may be performed by performing the shift operations and the addition operations between first k-ary parameters and an input image, which is input to each of convolution layers of the first DNN, and this may be represented by Equation 13.

$$I1 * W1 \approx b1(I1 \oplus Q1(\widetilde{W1}, k)) \quad \text{[Equation 13]}$$

In Equation 13, I1 denotes the input image for each convolution layer included in the first DNN, b1 denotes a scale factor, $Q1(\widetilde{W1}, k)$ denotes a function converting the first parameter matrix of the first DNN $\widetilde{W1}$ into the first k-ary parameter matrix including the k integer values, and $\oplus$ the operation denotes the convolution operation including the shift operations and the addition operations.

According to embodiments of the disclosure, by training the first parameters of the first DNN in a manner in which parameters of real numbers may be converted into a product of a scale factor and k-ary parameters, an amount of memory required for operations performed by the first DNN and an amount of convolution operation may be reduced while the performance of the first DNN is maintained.

In addition, when the values of the second parameters included in the second DNN are determined by completing the training of the first DNN and the second DNN, $\widetilde{W2}$) the final second parameters (for example, a second parameter matrix) may be converted into a product of a scale factor b2 and a second k-ary parameter matrix including k integer values.

Further, the scale factor b2 and the second k-ary parameter matrix including the k integer values may be stored in a memory. Here, when each of the k integer values included in the second k-ary parameter matrix is only 0 or $\pm 2^n$ (where n is an integer), a convolution operation performed in AI-upscaling an image by using the second DNN may be substituted with shift operations and addition operations.

Thus, the convolution operation may be performed by performing the shift operations and the addition operations on second k-ary parameters and an input image, which is input to each of convolution layers of the second DNN, and this may be represented by Equation 14.

$$I2 * W2 \approx b2(I2 \oplus Q2(\widetilde{W2}, k)) \quad \text{[Equation 14]}$$

In Equation 14, I2 denotes the input image for each convolution layer included in the second DNN, b2 denotes a scale factor, $Q2(\widetilde{W2}, k)$ denotes a function converting the second parameter matrix of the second DNN $\widetilde{W2}$ into the second k-ary parameter matrix including the k integer values, and $\oplus$ the operation denotes the convolution operation including the shift operations and the addition operations.

According to embodiments of the disclosure, by training the second parameters of the second DNN in a manner in which parameters of real numbers may be converted into a product of a scale factor and a k-ary parameters, an amount of memory required for operations performed by the second DNN and an amount of convolution operation may be reduced while the performance of the second DNN is maintained.

Figure 16:
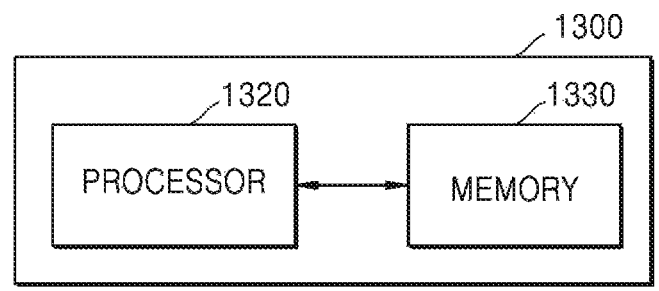
FIG. 16 is a block diagram illustrating a configuration of an AI encoding apparatus according to embodiments of the disclosure.

FIG. 16 is a block diagram illustrating a configuration of an AI encoding apparatus 1300 according to embodiments of the disclosure.

Referring to FIG. 16, the AI encoding apparatus 1300 according to embodiments of the disclosure may include a processor 1320 and memory 1330.

The processor 1320 according to embodiments of the disclosure may take overall control of the AI encoding apparatus 1300. The processor 1320 according to embodiments of the disclosure may execute one or more programs stored in the memory 1330.

The memory 1330 according to embodiments of the disclosure may store various data, programs, or applications for driving and controlling the AI encoding apparatus 1300. A program stored in the memory 1330 may include one or more instructions. A program (one or more instructions) or an application stored in the memory 1330 may be executed by the processor 1320.

The processor 1320 according to embodiments of the disclosure may perform any one or any combination of operations of the AI encoder 610 and the transmitter 630, which are shown in FIG. 6 and have been described with reference to FIG. 6, or operations of the AI encoding apparatus 600, which has been described with reference to FIG. 9.

For example, the processor 1320 may perform a convolution operation between the original image and the first k-ary parameter matrix and may perform an operation on the original image and the first parameters included in the first DNN by multiplying a result of the convolution operation by the scale factor a1. In addition, the processor 1320 may generate the first image (output image), which is AI-downscaled from the original image, based on a result of the operation set forth above. Here, each of the k integer values included in the first k-ary parameter matrix may be 0 or $\pm 2^n$ (where n is an integer).

Figure 17:
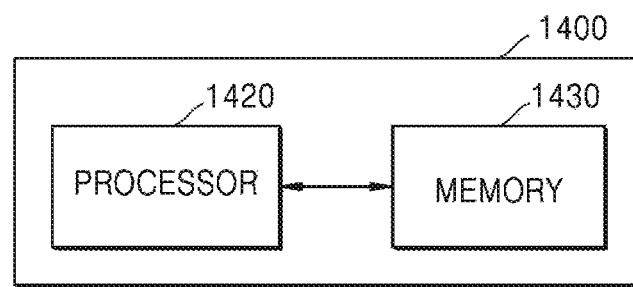
FIG. 17 is a block diagram illustrating a configuration of an AI decoding apparatus according to embodiments of the disclosure.

FIG. 17 is a block diagram illustrating a configuration of an AI decoding apparatus 1400 according to embodiments of the disclosure.

Referring to FIG. 17, the AI decoding apparatus 1400 according to embodiments of the disclosure may include a processor 1420 and memory 1430.

The processor 1420 according to embodiments of the disclosure may take overall control of the AI decoding apparatus 1400. The processor 1420 according to embodiments of the disclosure may execute one or more programs stored in the memory 1430.

The memory 1430 according to embodiments of the disclosure may store various data, programs, or applications for driving and controlling the AI decoding apparatus 1400. A program stored in the memory 1430 may include one or more instructions. A program (one or more instructions) or an application stored in the memory 1430 may be executed by the processor 1420.

The processor 1420 according to embodiments of the disclosure may perform any one or any combination of operations of the receiver 210 and the AI decoder 230, which are shown in FIG. 2 and have been described with reference to FIG. 6, or operations of the AI decoding apparatus 200, which has been described with reference to FIG. 13.

For example, the processor 1420 may perform a convolution operation between the second image and the second k-ary parameter matrix and may perform an operation between the second image and the second parameters included in the second DNN by multiplying a result of the convolution operation by the scale factor a2. In addition, the processor 1420 may generate the third image (output image), which is AI-downscaled from the second image, based on a result of the operation set forth above. Here, each of the k integer values included in the second k-ary parameter matrix may be 0 or $\pm 2^n$ (where n is an integer).

Figure 18:
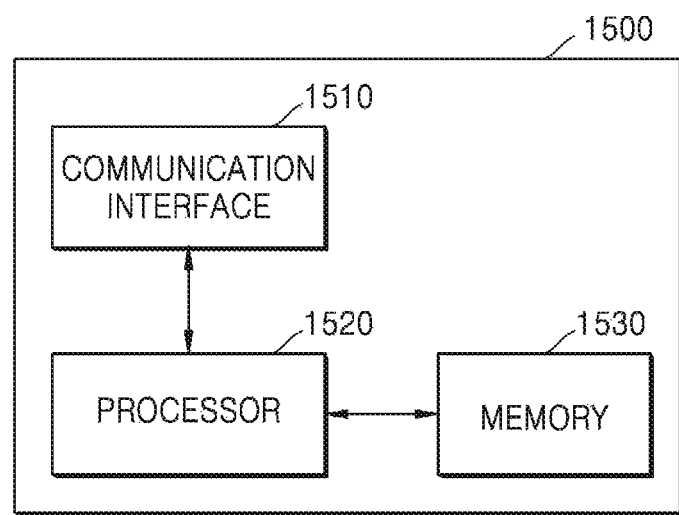
FIG. 18 is a block diagram illustrating a configuration of an electronic device configured to train a first DNN and a second DNN, according to embodiments of the disclosure.

FIG. 18 is a block diagram illustrating a configuration of an electronic device 1500 configured to train a first DNN and a second DNN, according to embodiments of the disclosure.

Referring to FIG. 18, the electronic device 1500 according to embodiments of the disclosure may include a communication interface 1510, a processor 1520, and a memory 1530. The processor 1520 according to embodiments of the disclosure may take overall control of the electronic device 1500. The processor 1520 according to embodiments of the disclosure may execute one or more programs stored in the memory 1530.

The memory according to embodiments of the disclosure may store various data, programs, or applications for driving and controlling the electronic device 1500. A program stored in the memory 1530 may include one or more instructions. A program (one or more instructions) or an application stored in the memory 1530 may be executed by the processor 1520.

The processor 1520 according to embodiments of the disclosure may perform any one or any combination of training operations of the first DNN and the second DNN, which are shown in FIGS. 9 and 14 and have been described with reference to FIGS. 9 and 14.

The processor 1520 may train the first DNN and the second DNN in connection with each other, and when the values of the first parameters included in the first DNN are determined by completing the training of the first DNN and the second DNN, the processor 1520 may convert the first parameters into a product of the scale factor a1 and the first k-ary parameter matrix including k integer values and thus store the product in the memory 1530.

In addition, when the values of the second parameters included in the second DNN are determined, the processor 1520 may convert the second parameters into a product of the scale factor a2 and the second k-ary parameter matrix including k integer values and thus store the product in the memory 1530.

The communication interface 1510 according to embodiments of the disclosure may include one or more components causing communication to be performed via a local area network (LAN), a wide area network (WAN), a value added network (VAN), a mobile radio communication network, a satellite communication network, or a combination thereof.

The communication interface 1510 may transmit parameters of the first DNN and the second DNN, which are complete with training, to an AI encoding apparatus or an AI decoding apparatus. For example, the communication interface 1510 may transmit the first parameters of the first DNN or both the scale factor a1 and the first k-ary parameter matrix to the AI encoding apparatus and may transmit the second parameters of the second DNN or both the scale factor a2 and the second k-ary parameter matrix to the AI decoding apparatus.

The block diagrams of the AI encoding apparatus 1300, the AI decoding apparatus 1400, and the electronic device 1500, which are respectively shown in FIGS. 16 to 18, are provided as examples. Each component in the block diagrams may be integrated, added, or omitted depending upon specifications of the AI encoding apparatus 1300, the AI decoding apparatus 1400, and the electronic device 1500, which are actually implemented. That is, two or more components may be integrated into one component or one component may be divided into two or more components, as needed. In addition, functions performed by the respective blocks are provided for illustrating the embodiments of the disclosure, and operations or devices of the respective blocks do not limit the scope of the disclosure.

The embodiments of the disclosure described above may be written as computer-executable programs or instructions that may be stored in a medium.

The medium may continuously store the computer-executable programs or instructions, or temporarily store the computer-executable programs or instructions for execution or downloading. Also, the medium may be any one of various recording media or storage media in which a single piece or plurality of pieces of hardware are combined, and the medium is not limited to a medium directly connected to a computer system, but may be distributed on a network. Examples of the medium include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. Other examples of the medium include recording media and storage media managed by application stores distributing applications or by websites, servers, and the like supplying or distributing other various types of software.

A model related to the DNN described above may be implemented via a software module. When the DNN model is implemented via a software module (for example, a program module including instructions), the DNN model may be stored in a computer-readable recording medium.

Also, the DNN model may be a part of the AI decoding apparatus 200 or AI encoding apparatus 600 described above by being integrated in a form of a hardware chip. For example, the DNN model may be manufactured in a form of an dedicated hardware chip for AI, or may be manufactured as a part of an existing general-purpose processor (for example, CPU or application processor) or a graphic-dedicated processor (for example GPU).

Also, the DNN model may be provided in a form of downloadable software. A computer program product may include a product (for example, a downloadable application) in a form of a software program electronically distributed through a manufacturer or an electronic market. For electronic distribution, at least a part of the software program may be stored in a storage medium or may be temporarily generated. In this case, the storage medium may be a server of the manufacturer or electronic market, or a storage medium of a relay server.

By representing, in a k-ary form, the first parameters included in the first DNN for AI downscaling of an image, the AI encoding apparatus according to the embodiments of the disclosure may reduce amounts of memory and calculation, which are required to AI-downscale an image, while maintaining AI downscaling performance of the first DNN.

By representing, in a k-ary form, the second parameters included in the second DNN for AI upscaling of an image, the AI decoding apparatus according to the embodiments of the disclosure may reduce amounts of memory and calculation, which are required to AI-upscale an image, while maintaining AI upscaling performance of the second DNN.

In a system, in which the AI encoding apparatus is configured as a server providing an AI-downscaled image, and in which the AI decoding apparatus is configured as a terminal receiving the AI-downscaled image, when a received image is AI-upscaled by the terminal, an amount of memory storing generated intermediate result values may be reduced, and thus, the efficiency of the system may be improved.

While the embodiments of the disclosure have been described with reference to the figures, it will be understood by those of ordinary skill in the art that various changes in form and details may be made therein without departing from the spirit and scope as defined by the following claims.

What is claimed is:

1. An artificial intelligence (AI) decoding apparatus comprising:
   a display;
   a memory storing one or more instructions; and
   a processor configured to execute the stored one or more instructions to:
      obtain AI data related to AI downscaling an original image to a first image, and image data corresponding to an encoding result on the first image, the AI data comprising an index indicating neural network (NN) setting information for an AI upscaling;
      obtain a second image by decoding the obtained image data;
      select a first NN setting information from a plurality of first NN setting information based on the AI data, the first NN setting information being for performing the AI upscaling on the obtained second image;
      obtain a third image that is upscaled from the second image, by performing an operation between the second image and first parameters of a filter kernel comprised in an upscaling NN set with the selected first NN setting information;
      providing the third image on the display,
   wherein each of the first parameters is represented by a product of a scale factor and one among integer values, and each of the integer values is 0 or $\pm 2^n$, where n is an integer,
   wherein the first image is obtained based on a downscaling NN set with a selected second NN setting information from among a plurality of second NN setting information for the AI downscaling,
   wherein the plurality of first NN setting information and the plurality of second NN setting information are obtained through joint training of the downscaling NN and the upscaling NN,
   wherein the first parameters are set in association with second parameters of a filter kernel comprised in the downscaling NN, and
   wherein the AI data includes information indicating a target of the AI upscaling including a target resolution.

2. The AI decoding apparatus of claim 1, wherein the upscaling NN is trained in connection with the downscaling NN and trained based on a training image that is obtained by training the downscaling NN.

3. The AI decoding apparatus of claim 1, wherein a first parameter matrix representing the first parameters is represented by a product of the scale factor and a second parameter matrix comprising the integer values,
   the memory stores the scale factor and the second parameter matrix, and the processor is further configured to execute the stored one or more instructions to obtain the third image by performing a convolution operation between the second image and the second parameter matrix and then multiplying a result of the performed convolution operation by the scale factor.

4. The AI decoding apparatus of claim 3, wherein the processor is further configured to execute the stored one or more instructions to perform the convolution operation by performing a shift operation and an addition operation between a pixel value comprised in the second image and the second parameter matrix.

5. The AI decoding apparatus of claim 1, wherein the target of the AI upscaling comprises a target image quality.

6. The AI decoding apparatus of claim 1, wherein the AI data is used to maintain a joint relationship between the upscaling NN and the downscaling NN.

7. The AI decoding apparatus of claim 1, wherein the target of the AI upscaling corresponds to a downscaling target of the AI downscaling, and
wherein the downscaling target is selected based on compression history information.

8. The AI decoding apparatus of claim 7, wherein the compression history information indicates a number of times that a plurality of encoding quality values have been used previously, and
wherein the downscaling target is selected based on a comparison between the number of times and an threshold number.

9. An artificial intelligence (AI) encoding apparatus comprising:
a memory storing one or more instructions; and
a processor configured to execute the stored one or more instructions to:
select a second neural network (NN) setting information from a plurality of second NN setting information;
obtain a first image that is downscaled from an original image, by performing an operation between the original image and second parameters of a filter kernel comprised in a downscaling NN set with the second NN setting information;
obtain image data by encoding the obtained first-image; and
providing the image data, and AI data related to AI downscaling to an AI decoding apparatus, the AI data comprising an index indicating a first NN setting information for an AI upscaling being used to select the first NN setting information from a plurality of first NN setting information,
wherein each of the second parameters is represented by a product of a scale factor and one among integer values, and each of the integer values is 0 or $\pm 2^n$, where n is an integer,
wherein the plurality of first NN setting information and the plurality of second NN setting information are obtained through joint training of the downscaling NN and the upscaling NN,
wherein the second parameters are set in association with first parameters of a filter kernel comprised in an upscaling NN, and
wherein the AI data includes information indicating a target of the AI upscaling including a target resolution.

10. The AI encoding apparatus of claim 9, wherein the downscaling NN is trained in connection with the upscaling NN and trained based on loss information that is obtained by training the upscaling NN.

11. The AI encoding apparatus of claim 10, wherein the downscaling NN is trained based on first loss information that is generated by upscaling in the training of the upscaling NN, and based on second loss information that is generated by downscaling in training the downscaling NN.

12. The AI encoding apparatus of claim 9, wherein a first parameter matrix representing the second parameters is represented by a product of the scale factor and a second parameter matrix including the integer values,
the memory stores the scale factor and the second parameter matrix, and
the processor is further configured to execute the stored one or more instructions to obtain the first image by performing a convolution operation between the original image and the second parameter matrix and then multiplying a result of the performed convolution operation by the scale factor.

13. The AI encoding apparatus of claim 12, wherein the processor is further configured to execute the stored one or more instructions to perform the convolution operation by performing a shift operation and an addition operation between a pixel value comprised in the original image and the second parameter matrix.

14. An operating method of an artificial intelligence (AI) decoding apparatus, the operating method comprising:
obtaining AI data related to AI downscaling an original image to a first image, and image data corresponding to an encoding result on the first image, the AI data comprising an index indicating neural network (NN) setting information for an AI upscaling;
obtaining a second image by decoding the obtained image data;
selecting a first NN setting information from a plurality of first NN setting information based on the AI data, the first NN setting information being for performing the AI upscaling on the obtained second image; and
obtaining a third image that is upscaled from the second image, by performing an operation between the second image and first parameters of a filter kernel comprised in an upscaling NN set with the selected first NN setting information,
wherein each of the first parameters is represented by a product of a scale factor and one among integer values, and each of the integer values is 0 or $\pm 2^n$, where n is an integer,
wherein the first image is obtained based on a downscaling NN set with a selected second NN setting information from among a plurality of second NN setting information for the AI downscaling,
wherein the plurality of first NN setting information and the plurality of second NN setting information are obtained through joint training of the downscaling NN and the upscaling NN,
wherein the first parameters are set in association with a second parameters of a filter kernel comprised in the downscaling NN,
wherein the AI data includes information indicating a target of the AI upscaling including a target resolution.

15. The operating method of claim 14, wherein the upscaling NN is trained in connection with the downscaling NN and trained based on a training image that is obtained by training the downscaling NN.

16. The operating method of claim 14, wherein a first parameter matrix representing the first parameters is represented by a product of the scale factor and a second parameter matrix comprising the integer values, and the obtaining of the third image comprises obtaining the third image by performing a convolution operation between the second image and the second parameter matrix and then multiplying a result of the performed convolution operation by the scale factor.

17. The operating method of claim 16, wherein the obtaining of the third image comprises performing the convolution operation by performing a shift operation and an addition operation between a pixel value comprised in the second image and the second parameter matrix.

* * * * *